(12) United States Patent
Radulescu

(10) Patent No.: US 7,564,865 B2
(45) Date of Patent: Jul. 21, 2009

(54) WEIGHT FACTOR BASED ALLOCATION OF TIME SLOT TO USE LINK IN CONNECTION PATH IN NETWORK ON CHIP IC

(75) Inventor: Andrei Radulescu, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 283 days.

(21) Appl. No.: 10/599,561

(22) PCT Filed: Mar. 23, 2005

(86) PCT No.: PCT/IB2005/050999

§ 371 (c)(1),
(2), (4) Date: Oct. 2, 2006

(87) PCT Pub. No.: WO2005/099187

PCT Pub. Date: Oct. 20, 2005

(65) Prior Publication Data

US 2007/0195748 A1    Aug. 23, 2007

(30) Foreign Application Priority Data

Apr. 5, 2004   (EP)   ................... 04101400

(51) Int. Cl.
*H04L 12/43* (2006.01)
*G06F 15/173* (2006.01)
(52) U.S. Cl. .................. 370/458; 712/32
(58) Field of Classification Search ........ None
See application file for complete search history.

(56) References Cited

U.S. PATENT DOCUMENTS 6,958,986 B2 *  10/2005  Cain ............... 370/337

2008/0123666 A1 *  5/2008  Ciordas et al. ........... 370/400
2008/0186998 A1 *  8/2008  Rijkema ............... 370/458

(Continued)

OTHER PUBLICATIONS

Rijpkema et al: "A Router Architecture for Networks on Silicon"; In Progress, Oct. 2001.

(Continued)

*Primary Examiner*—Kenneth S Kim

(57) ABSTRACT

An integrated circuit comprising a plurality of processing modules (M, S; IP) and a network (N) arranged for coupling said modules (M, S; IP) is provided. Said integrated circuit further comprises a plurality of network interfaces (NI) each being coupled between one of said processing modules (M, S; IP) and said network (N). Said network (N) comprises a plurality of routers (R) coupled via network links (L) to adjacent routers (R). Said processing modules (M, S; IP) communicate between each other over connections using connection paths (C1-C12) through the network (N), wherein each of said connection paths (C1-C12) employ at least one network link (L) for a required number of time slots. At least one time slot allocating unit (SA) is provided for computing a link weight factor for at least one network link (L) in said connection path (C1-C12) as a function of at least one connection requirement for said at least one network link (L), for computing a connection path weight factor for at least one connection path (C1-C12) as a function of the computed link weight factor of at least one network link (L) in said connection path (C1-C12), and for allocating time slots to said network links (L) according to the computed connection path weight factors.

17 Claims, 19 Drawing Sheets

U.S. PATENT DOCUMENTS

2008/0205432 A1* 8/2008 Gangwal .................... 370/458

OTHER PUBLICATIONS

Rijpkema et al: "Trade-Offs in the Design of a Router With Both Guaranteed and Best-Effort Services for Networks on Chip"; IEEE Proceedings-Computers and Digital Techniques, vol. 150, No. 5, Sep. 22, 2003, pp. 294-302, XP002321033.

Kolliopoulos et al: "Approximating Disjoint-Path Problems Using Greedy Algorithms and Packing Integer Programs"; Integer Programming and Combinatorial Optimization. 6th Intl. IPCO Conference Springer-Verlag Berlin, Germany, OnLine! 1998, pp. 153-168, XP002335533.

Mol J. "Resource Allocation for Streaming Applications in Multiprocessors"; Masters Thesis Computer Science, Online!, Sep. 17, 2004, pp. 1-75, XP002335534.

* cited by examiner

WEIGHT FACTOR BASED ALLOCATION OF TIME SLOT TO USE LINK IN CONNECTION PATH IN NETWORK ON CHIP IC

FIELD OF THE INVENTION

The invention relates to an integrated circuit having a plurality of processing modules and a network arranged for coupling processing modules and a method for time slot allocation in such an integrated circuit, and a data processing system.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load, and the bus constitutes a communication bottleneck as it enables only one device to send data to the bus.

A communication network forms an effective way to overcome these disadvantages. Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Introducing networks as on-chip interconnects radically changes the communication when compared to direct interconnects, such as buses or switches. This is because of the multi-hop nature of a network, where communication modules are not directly connected, but are remotely separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control), which must be handled either by a intellectual property block (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

NoCs differ from off-chip networks mainly in their constraints and synchronization. Typically, resource constraints are tighter on chip than off chip. Storage (i.e., memory) and computation resources are relatively more expensive, whereas the number of point-to-point links is larger on chip than off chip. Storage is expensive, because general-purpose on-chip memory, such as RAMs, occupy a large area. Having the memory distributed in the network components in relatively small sizes is even worse, as the overhead area in the memory then becomes dominant.

Off-chip networks typically use packet switching and offer best-effort services. Contention can occur at each network node, making latency guarantees very hard to offer. Throughput guarantees can still be offered using schemes such as rate-based switching or deadline-based packet switching, but with high buffering costs. An alternative to provide such time-related guarantees is to use time-division multiple access (TDMA) circuits, where every circuit is dedicated to a network connection. Circuits provide guarantees at a relatively low memory and computation cost. Network resource utilization is increased when the network architecture allows any left-over guaranteed bandwidth to be used by best-effort communication.

A network on chip (NoC) typically consists of a plurality of routers and network interfaces. Routers serve as network nodes and are used to transport data from a source network interface to a destination network interface by routing data on a correct path to the destination on a static basis (i.e., route is predetermined and does not change), or on a dynamic basis (i.e., route can change depending e.g., on the NoC load to avoid hot spots). Routers can also implement time guarantees (e.g., rate-based, deadline-based, or using pipelined circuits in a TDMA fashion). More details on a router architecture can be found in, A router architecture for networks on silicon, by Edwin Rijpkema, Kees Goossens, and Paul Wielage, In PROGRESS, October 2001.

The network interfaces are connected to an IP block (intellectual property), which may represent any kind of data processing unit or also be a memory, bridge, etc. In particular, the network interfaces constitute a communication interface between the IP blocks and the network. The interface is usually compatible with the existing bus interfaces. Accordingly, the network interfaces are designed to handle data sequentialisation (fitting the offered command, flags, address, and data on a fixed-width (e.g., 32 bits) signal group) and packetization (adding the packet headers and trailers needed internally by the network). The network interfaces may also implement packet scheduling, which can include timing guarantees and admission control.

On-chip systems often require timing guarantees for their interconnect communication. Therefore, a class of communication is provided, in which throughput, latency and jitter are guaranteed, based on a notion of global time (i.e., a notion of synchronicity between network components, i.e. routers and network interfaces), wherein the basic time unit is called a slot or time slot. All network components usually comprise a slot table of equal size for each output port of the network component, in which time slots are reserved for different connections and the slot tables advance in synchronization (i.e., all are in the same slot at the same time). The connections are used to identify different traffic classes and associate properties to them.

A cost-effective way of providing time-related guarantees (i.e., throughput, latency and jitter) is to use pipelined circuits in a TDMA (Time Division Multiple Access) fashion, which is advantageous as it requires less buffer space compared to rate-based and deadline-based schemes on systems on chip (SoC) which have tight synchronization.

At each slot, a data item is moved from one network component to the next one, i.e. between routers or between a router and a network interface. Therefore, when a slot is reserved at an output port, the next slot must be reserved on the following output port along the path between an master and a slave module, and so on.

When multiple connections with timing guarantees are set up, the slot allocation must be performed such that there are no clashes (i.e., there is no slot allocated to more than one connection). The task of finding an optimum slot allocation for a given network topology i.e. a given number of routers and network interfaces, and a set of connections between IP blocks is a highly computational-intensive problem (NP complete) as it involves finding an optimal solution which requires exhaustive computation time.

It is therefore an object of the invention to provide an improved slot allocation in a network on chip environment.

This object is achieved by an integrated circuit according to claim 1 and a method for time slot allocation according to claim 16 as well as a data processing system according to claim 17.

Therefore, an integrated circuit comprising a plurality of processing modules and a network arranged for coupling said modules is provided. Said integrated circuit further comprises a plurality of network interfaces each being coupled between one of said processing modules and said network. Said network comprises a plurality of routers coupled via network links to adjacent routers. Said processing modules communicate between each other over connections using connection paths through the network, wherein each of said connection paths employ at least one network link for a required number of time slots. At least one time slot allocating unit is provided for computing a link weight factor for at least one network link in said connection path as a function of at least one connection requirement for said at least one network link, for computing a connection path weight factor for at least one connection path as a function of the computed link weight factor of at least one network link in said connection path, and for allocating time slots to said network links according to the computed connection path weight factors.

Accordingly, a time slot allocation based on the actual connection requirement can be implemented.

According to an aspect of the invention said connection requirements comprise bandwidth, latency, jitter, priority and/or slot allocation requirements of the connection path. The time slot allocation can be implemented and optimized according to one of the specific connection requirements.

According to an aspect of the invention, said at least one time slot allocating unit is adapted to allocate time slots to said network links in decreasing order of connection path weight factor. Therefore, those network links requiring more time slots are considered first during the time slot allocation as these connections have more constraints, and, therefore, if left at the end, have less chances to find free slots. As opposed to that, shorter channels going through less utilized links, have more freedom in finding slots, and can thus be left toward the end of the slot allocation.

According to an aspect of the invention, said at least one time slot allocating unit is adapted to compute said connection path weight factor based on said computed link weight factors, the length of said connection path, and the bandwidth, latency, jitter, and/or the number of time slots required for said connection path. Therefore, the length of the connection path and the required amount of time slots may also be considered while computing the connection path weight factor.

According to a further aspect of the invention, said at least one time slot allocating unit is adapted to compute the connection path weight factor based on said computed link weight factors, the length of said connection path, and the bandwidth, latency, jitter, and/or the number of time slots required for said connection path weighted by a first, second and third weight factor, respectively. The contribution of the length of the connection path and the required bandwidth, latency, jitter, and/or time slots as well as the link weight factors may be varied by adapting the respective weight factors.

According to an aspect of the invention, at least one time slot allocation unit is arranged in at least one of said plurality of network interface and comprises a first time slot table with entries specifying connections to which time slots are allocated to. Said routers can also comprise second time slot tables with entries representing reservations of time slots without specifying connections. The slot tables in the routers can be smaller as the information, to which a time slot is associated to, does not need to be stored in these slot tables. The information per slot can be smaller, however, the slot tables will probably end up being larger, because there are multiple ports on a router (slot table size may be #ports*#slots*information_per_slot).

According to an aspect of the invention, at least one time slot allocation unit is arranged in at least one of said plurality of network interface and comprises a first time slot table with entries specifying connections to which time slots are allocated to, and said routers comprise second time slot tables with entries comprising information for routing data in said network. Accordingly, as the routing information is stored in the routers, packet headers can be omitted leading to a higher throughput.

The invention also relates to a method for time slot allocation in an integrated circuit having a plurality of processing modules, a network arranged for coupling said modules and a plurality of network interfaces each being coupled between one of said processing modules. Said network comprises a plurality of routers coupled via network links to adjacent routers. The communication between processing modules is performed over connections using connection paths through the network, wherein each of said connection paths employ at least one network link for a required number of time slots. A link weight factor for at least one network link in said connection path is computed as a function of connection requirements for said network links. A connection path weight factor for at least one connection path is computed as a function of the computed link weight factors of at least one network link in a connection path and connection requirements of the said connection path. Time slots are allocated to said links according to the computed connection path weight factors.

The invention also relates to a data processing system comprising a plurality of processing modules and a network arranged for coupling said modules. Said integrated circuit further comprises a plurality of network interfaces each being coupled between one of said processing modules and said network. Said network comprises a plurality of routers coupled via network links to adjacent routers. Said processing modules communicate between each other over connections using connection paths through the network, wherein each of said connection paths employ at least one network link for a required number of time slots. At least one time slot allocating unit is provided for computing a link weight factor for at least one network link in said connection path as a function of connection requirements for said at least one network link, for computing a connection path weight factor for at least one connection path as a function of the computed link weight factors of at least one network link in said connection path and connection requirements of the said connection path, and for allocating time slots to said network links according to the computed connection path weight factors.

Accordingly, the time slot allocation may also be performed in a multi-chip network or a system or network with several separate integrated circuits.

The invention is based on the idea to perform the slot allocations by computing a link weight as a function of the bandwidth, latency, jitter, and/or numbers of slots requested for each channel, i.e. each connection path, using the link and by computing a channel weight as sum of the link weights used by the channel.

Other aspects of the invention are defined in the dependent claims.

The invention is now described in more detail with reference to the drawings.

DESCRIPTION OF THE PREFERRED EMBODIMENTS

The following embodiments relate to systems on chip, i.e. a plurality of modules on the same chip communicate with each other via some kind of interconnect. The interconnect is embodied as a network on chip NOC. The network on chip may include wires, bus, time-division multiplexing, switch, and/or routers within a network. At the transport layer of said network, the communication between the modules is performed over connections. A connection is considered as a set of channels, each having a set of connection properties, between a first module and at least one second module. For a connection between a first module and a single second module, the connection may comprises two channels, namely one from the first module to the second module, i.e. the request channel, and a second channel from the second to the first module, i.e. the response channel. The request channel is reserved for data and messages from the first to the second, while the response channel is reserved for data and messages from the second to the first module. If no response is required, the connection may only comprise one channel. However, if the connection involves one first and N second modules, 2*N channels are provided. Therefore, a connection or the path of the connection through the network, i.e. the connection path comprises at least one channel. In other words, a channel corresponds to the connection path of the connection if only one channel is used. If two channels are used as mentioned above, one channel will provide the connection path e.g. from the master to the slave, while the second channel will provide the connection path from the slave to the master. Accordingly, for a typical connection, the connection path will comprise two channels. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
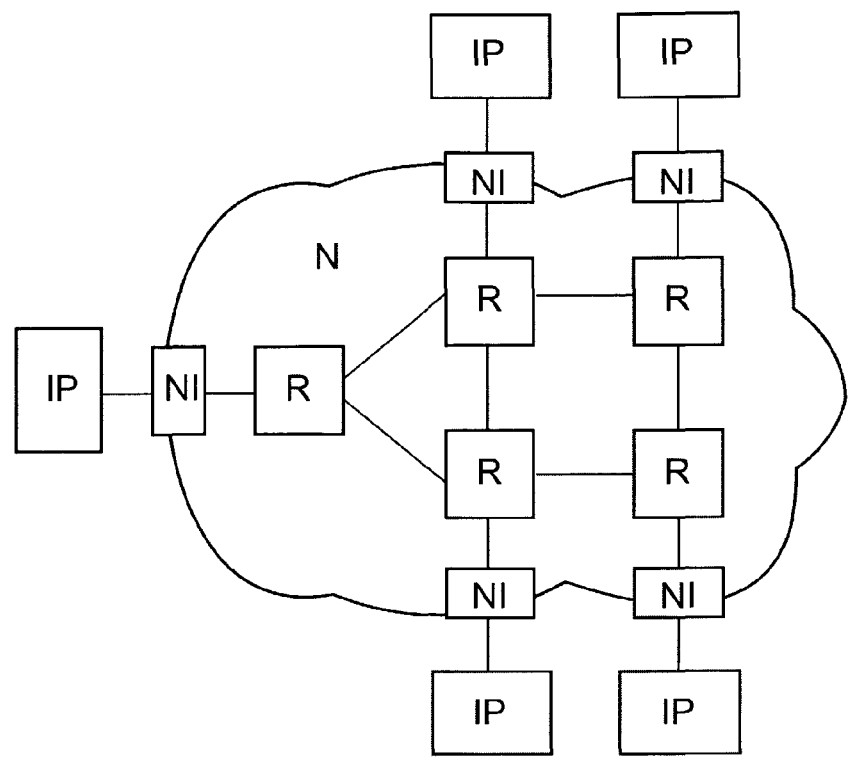
FIG. 1 shows the basic structure of a network on chip according to the invention.

FIG. 1 shows a network on chip according to the present invention. The system comprises several so-called intellectual property blocks IPs (computation elements, memories or a subsystem which may internally contain interconnect modules) which are each connected to a network N via a network interface NI, respectively. The network N comprises a plurality of routers R, which are connected to adjacent routers R via respective links.

The network interfaces NI are used as interfaces between the IP blocks and the network N. The network interfaces NI are provided to manage the communication of the respective IP blocks and the network N, so that the IP blocks can perform their dedicated operation without having to deal with the communication with the network N or other IP blocks. The IP blocks may act as masters, i.e. initiating a request, or may act as slaves, i.e. receiving a request from a master and processing the request accordingly.

Figure 2:
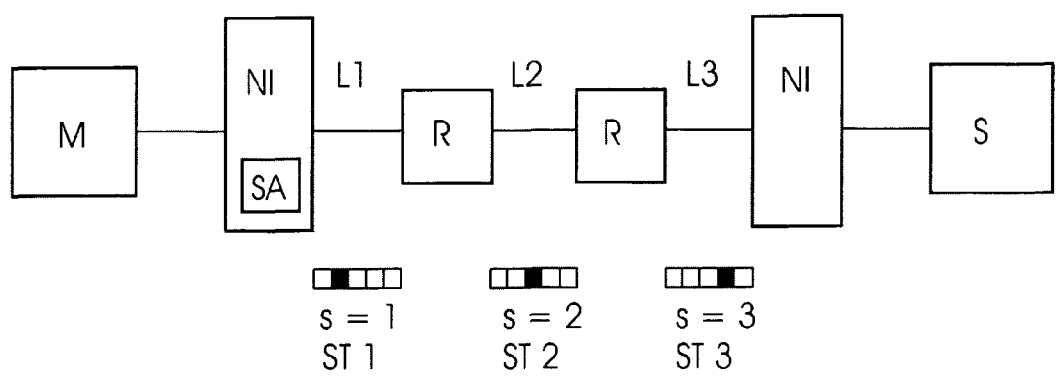
FIG. 2 shows a basic slot allocation for a connection in a network according to FIG. 1.

FIG. 2 shows a block diagram of a connection and a basic slot allocation in a network on chip according to FIG. 1. In particular, the connection between a master M and a slave S is shown. This connection is realized by a network interface NI associated to the master M, two routers, and a network interface NI associated to a slave S. The network interface NI associated to the master M comprises a time slot allocation unit SA. Alternatively, the network interface NI associated to the slave S may also comprise a time slot allocation unit SA. A first link L1 is present between the network interface NI associated to the master M and a first router R, a second link L2 is present between the two routers R, and a third link L3 is present between a router and the network interface NI associated to the slave S. Three slot tables ST1-ST3 for the output ports of the respective network components are also shown. These slot tables are preferably implemented on the output side, i.e. the data producing side, of the network elements like network interfaces and routers. For each requested slot, one slot is reserved in each slot table of the links along the connection path. All these slots must be free, i.e., not reserved by other channels. Since the data advance from one network component to another each slot, starting from slot s=1, the next slot along the connection must be reserved at slot s=2 and then at slot s=3.

The inputs for the slot allocation determination performed by the time slot allocation unit SA are the network topology, like network components, with their interconnection, and the slot table size, and the connection set. For every connection, its paths and its bandwidth, latency, jitter, and/or slot requirements are given. A connection consists of at least two channels or connection paths (a request channel from master to slave, and a response channel from slave to master). Each of these channels is set on an individual path, and may comprise different links having different bandwidth, latency, jitter, and/or slot requirements. To provide time related guarantees, slots must be reserved for the links. Different slots can be reserved for different connections by means of TDMA. Data for a connection is then transferred over consecutive links along the connection in consecutive slots.

Figure 3:
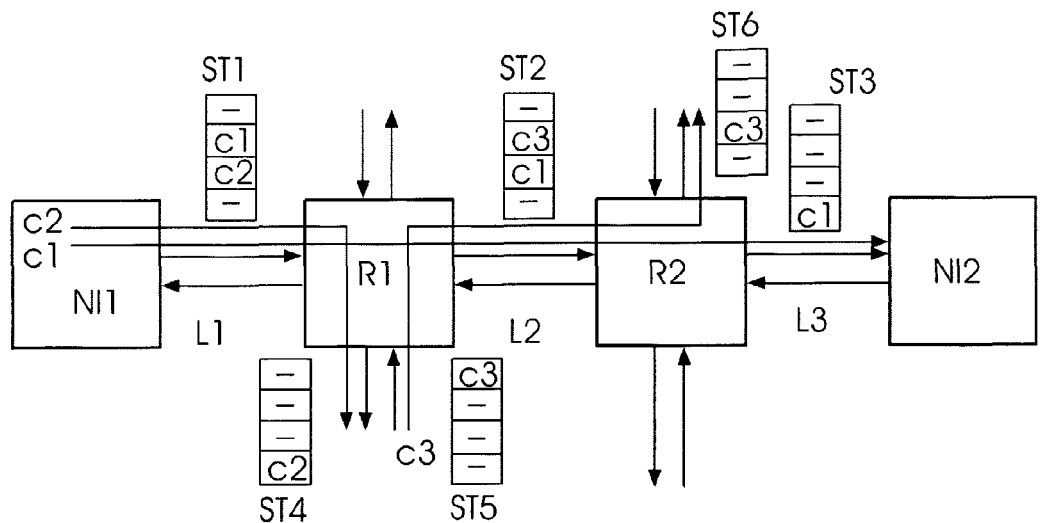
FIG. 3 shows a slot allocation in more detail in a network according to FIG. 1.

FIG. 3 shows a table implementation of FIG. 2 in more detail. Here, two network interfaces NI1, NI2 and two routers R1, R2 and the three links L1-L3 between the network interface NI1 and the router R1, between the router R1 and the router R2, and between the router R1 and the network interface NI2 are shown, respectively. The IP blocks are not shown. The slot tables ST1-ST3 are shown for each of the labeled link L1-L3. These links are bi-directional, and, hence, for each link there is a slot table for each of the two directions; the slot tables ST1-ST3 are only shown for one direction. Additionally, three connections c1-c3 are depicted. In addition to the above three slot tables ST1-ST3, further slot tables ST4-ST6 are shown. Now all slot tables ST1-ST6 are shown which are related to the three connections c1-c3. The first connection c1 extends from the network interface NI1 to the network interface NI2 via the routers R1 and R2. The second connection c2 extends from the network interface NI1 to the router R1 and then to a further network component (not shown) using slot table ST4. The third connection c3 may originate from a not shown network component and passes from the router R1 to the router R2 and further to another not shown network component using slot table ST6. The connection c1 reserves one slot in each of the three links L1-L3 it uses (NI1 to R1, R1 to R2, and R2 to NI2). The slots in these links must be consecutive (slot 2, slot 3, and slot 4, respectively). From a router point of view, in a time slot, the router receives data from input links, on the connection c1-c3 those links L1-L3 are reserved for. The data is stored in the router. At the same time, the router sends the data it has received the previous slot to output links. According to this model, as the data is stored in a router for at most one slot, the slots of a connection must be reserved consecutively.

A possible generalization or alternative of the slot allocation problem would be to allow data to be buffered in the routers for more than one slot duration. As a result, slot allocation becomes more flexible, which could lead to better link utilization, at the expense of more buffering, and potentially longer latencies.

Slots must be reserved such that there are no conflicts on links. This is, there are no two connections that reserve the same slot of the same link. Therefore, C1 reserves slot 2 for the link between NI1 and R1. Consequently, C2 cannot use slot 2 for the same link.

The problem of finding a valid slot allocation (i.e., with consecutive slots, and conflict free) which is optimal (i.e., uses the minimum number of slots) is NP complete.

Figure 4:
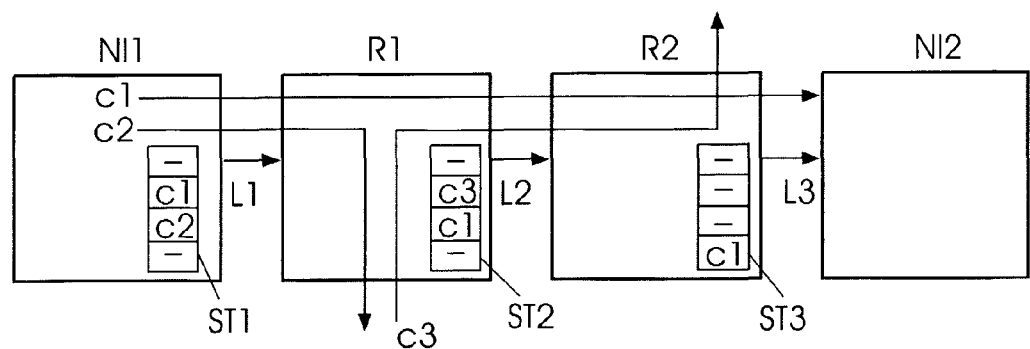
FIG. 4 shows a more detailed slot allocation according to a first embodiment.
Figure 5:
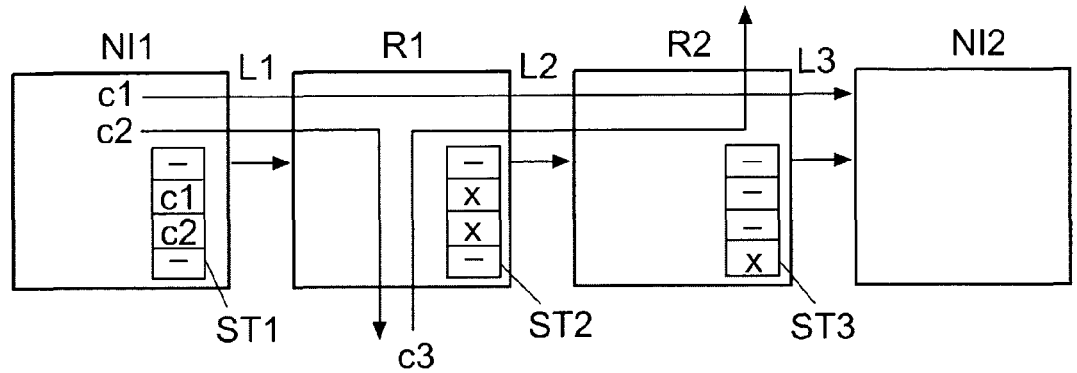
FIG. 5 shows a more detailed slot allocation according to a second embodiment.

FIG. 4 shows a straightforward slot table implementation according to a first embodiment by implementing for each of the first, second and third links L1-L3 a table which specifies which slots are reserved for which connection. In particular, only those slot tables ST1-ST3 are shown, which are required by the three connections c1-c3 for the three links L1-L3. A preferred place to store this table is in the router/network interface producing data for that link, i.e. the output port, because the router/network interface has to know, when a link is reserved or not, in order to produce data for that link. The table may also be part of the time slot allocation unit SA. FIG. 5 shows a more efficient slot-allocation encoding according to a second embodiment. Here, also only those slot tables ST1-ST3 are shown, which are required by the three connections c1-c3 for the three links L1-L3. The information to which connection a slot belongs is stored in the network interface NI and in particular in the time slot allocation unit SA, while the slot tables ST1-ST3 in the routers only mark if a slot is reserved or not for the links. The routers need not know the connections associated with slots, as they only moves data from one network element to another and finally to the correct output based on the packet headers (containing a destination address or a path to destination).

Figure 6:
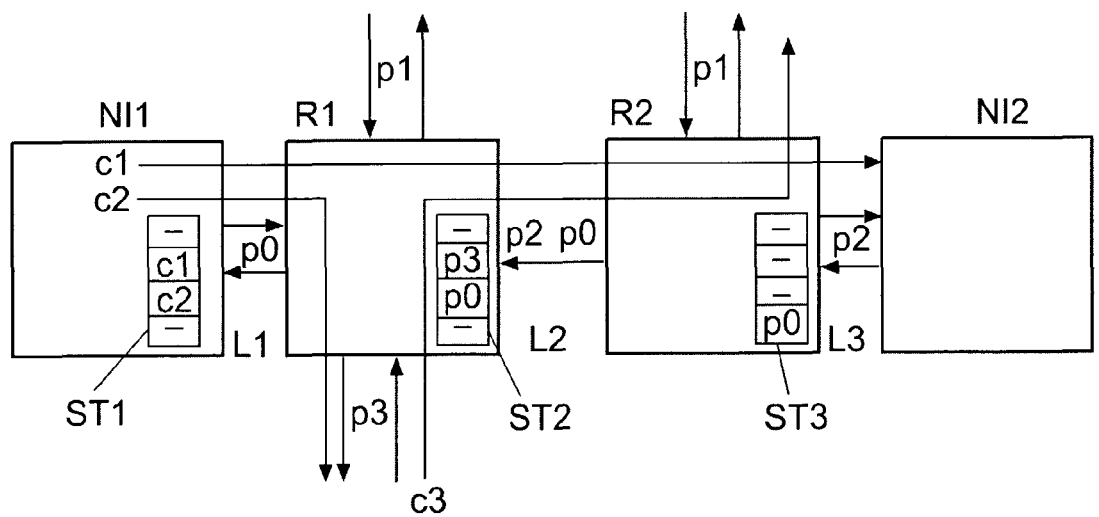
FIG. 6 shows a more detailed slot allocation according to a third embodiment.

In FIG. 6, a possible variation according to a third embodiment to the above encoding of FIG. 4 and FIG. 5 is shown. Here, the routing information is stored in the router itself (instead of the packet header). In output port slot tables ST1-ST3, slots indicate from which input data is consumed. In this way, the packet header can be omitted, leading to more throughput, at the expense of larger slot tables in the routers.

Now the actual slot allocation function is described, which may be implemented in the time slot allocation unit SA. The result leads to a slot allocation which corresponds to the slot requirements. For each link in the path of the connection, a weight is computed as a function of the bandwidth, latency, jitter priority and/or number of slots requested for each channel $ch_i$ in the connection path that uses that link:

$$\text{weight}(\text{link}) = f(\text{bandwidth}(ch_i), \text{latency}(ch_i), \text{jitter}(ch_i), \text{priority}(ch_i), \text{slots}(ch_i)) \forall ch_i \text{ such that } \text{link} \in ch_i$$

Alternatively, for each link in the at least one channel in the connection path a weight is computed as a sum of the number of slots requested or required for each connection path, i.e. each channel, that uses that link:

$$\text{weight}(\text{link}) = \sum_{\text{link} \in \text{path}(\text{channel})} \text{slots}(\text{channel})$$

Then for each channel in a connection path, a weight is computed as a function (e.g., the sum) of the weights of the links in the channel path as part of the connection path), and possibly other properties of the channel (e.g., bandwidth, latency, priority):

$$\text{weight}(ch) = f(\text{weight}(\text{link}_i), \text{bandwidth}(ch), \text{latency}(ch), \text{jitter}(ch), \text{priority}(ch), \text{slots}(ch)) \forall \text{link}_i \in ch$$

Or, alternatively, for each channel(i.e. each connection path), a weight is computed as the sum of the weights of the links in the channel path:

$$\text{weight}(\text{channel}) = \sum_{\text{link} \in \text{path}(\text{channel})} \text{weight}(\text{link})$$

For the alternative above simple functions, $$\text{weight}(\text{link}) = \sum_{\text{link} \in \text{path}(\text{channel})} \text{slots}(\text{channel})$$

$$\text{weight}(\text{channel}) = \sum_{\text{link} \in \text{path}(\text{channel})} \text{weight}(\text{link})$$

this algorithm may be implemented by the following pseudo code:

```
- Compute link weights
FOR all channels C DO
  FOR all link L ∈ path(C) DO
    weight[L] + = slots[C]
  END FOR
END FOR
- Compute channel weights
FOR all channels C DO
  FOR all link L ∈ path(C) DO
    weight[C] + = weight[L]
  END FOR
END FOR
- Perform slot allocation
BEGIN
FOR all channels C sorted decreasingly by weight(C) DO
  Find slots[C] free slots and allocated them to C
END FOR
```

Slots are allocated to the channels in the decreasing order of their calculated weights. For each requested slot, there is one slot reserved in each slot table of the links along the channel path. All these slots must be free, i.e. not reserved previously by other channels. These slots may be allocated in a trial and error fashion: starting from a particular slot, a number of slots are checked until a free one is found in all of the links along the path.

Slots can be tried for allocation using different policies. Examples are consecutive slots, or evenly distributed slots. The reason multiple policies are needed is that different properties can be optimized with different policies. For example, consecutive slots may reduce header overhead, while evenly distributed slots may reduce latency.

The proposed technique has a low complexity of $O(C \times L \times S)$, where C is the number of channels, L is the number of links, and S is the slot table size. The slot allocations obtained with this algorithm are comparable to the optimum (obtained at a much higher complexity: $O(S^c)$), and a factor of 2 better than a greedy algorithm (i.e., with a random order for channel allocation).

An alternative example algorithm is now described. Again, for each link, a weight is computed as the sum of the number of slots requested for each channel that uses that link:

$$\text{weight(link)} = \sum_{link \,\in\, path(channel)} \text{slots (channel)}$$

Then for each channel, a weight is computed as the sum of the weights of the links the channel path:

$$\text{weight(channel)} = a_1 \times \sum_{link \,\in\, path(channel)} \text{weight(link)} + a_2 \times \text{length(channel)} + a_3 \times \text{slots (channel)}$$

where $a_1$, $a_2$, and $a_3$ are constants (this is an example of weight formulas, but others are also possible).

This example algorithm may be implemented by the following pseudo code:

```
- Compute link weights
FOR all channels C DO
```

```
  FOR all link L ∈ path(C) DO
    weight[L] += slots[C]
  END FOR
END FOR
- Compute channel weights
FOR all channels C DO
  FOR all link L ∈ path(C) DO
    weight[C] += weight[L]
  END FOR
  weight[C] = a₁ × weight[C] + a₂ × length[C] + a₃ × slots[C]
END FOR
- Perform slot allocation
BEGIN
FOR all channels C sorted decreasingly by weight(C) DO
  Find slots[C] free slots and allocate them to C
END FOR
```

The computation of the link weights according to the second embodiment is as described in the first code, but the channel weights are calculated differently. The idea behind this channel weight formula is to start the scheduling with the channels requiring more slots as they pass through frequently used links, i.e. going through hot spots (links with a high load, and, hence, a large slot to be reserved), and channels having long paths by given a higher weight such that they are scheduled first. The reason is that these connections have more constraints, and, therefore, if left at the end, have less chances to find free slots. As opposed to that, shorter channels going through less utilized links, have more freedom in finding slots, and can thus be left toward the end of the slot allocation.

Slots may be allocated to the channels (i.e. each connection path) in the decreasing order of their computed weights. For each requested slot, there is one slot reserved in each slot table of the links along the channel path as shown in FIG. 2. All these slots must be free, i.e., not reserved previously by other channels (i.e. each connection path). These slots are allocated in a trial and error fashion: starting from a particular slot, slots are checked until the required number of slots are found free in all links along the path. An example algorithm trace is presented in the following section.

Figure 7:
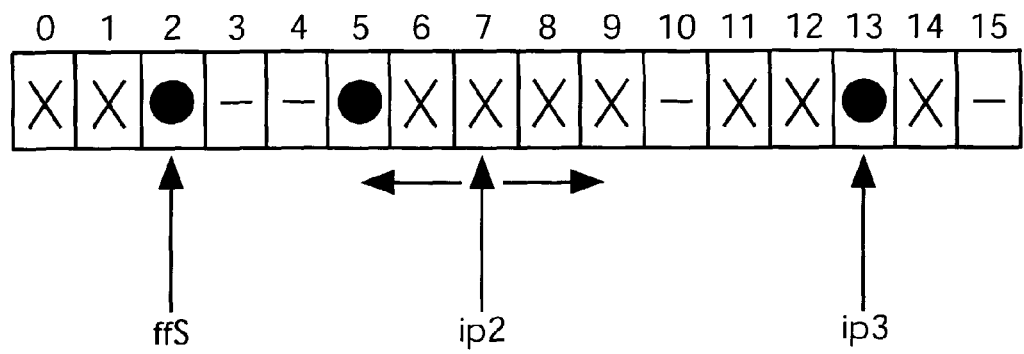
FIG. 7 shows an illustration of a method for finding free slots.

FIG. 7 shows a method of finding free time slots. Here, as an example, a slot table of size 16 is depicted. The slot finding process can be performed in various ways. One example is to find slots in a greedy way, i.e., the first N free slots. Another example is to find slots equally distanced in order to minimize buffer space. This can be done by finding a first free slot ffs, then computing the positions that are equally distanced in the slot table, and then searching locally around the computed positions to find the nearest free position. The slots that are already reserved are marked with a cross in FIG. 7. The first free slot ffs is slot 2. As there are 16 slots, the ideal positions (2nd position ip2, 3rd position ip3) for the other two slots would be slot 7 and 13 (to get an equal distance between them), respectively. As slot 7 is already reserved, a free slot is searched in the neighborhood of slot 7. The nearest free slot found is slot 5. As slot 13 is free, and it can be reserved as well. Consequently, the three slots reserved are 2, 5, and 13 and are marked with a black ball.

It should be noted that free slots for a connection are those that are free along the complete path, i.e. consecutive time slots should be free in consecutive links along the path. Therefore, all slot tables along a connection path must be checked to find a free slot for a particular connection. A simple way of searching free slots for a connection is to start from the first link of the connection, and try all subsequent slot tables along the path, skipping those reserved. To minimize the searching time, one may also start from the most loaded link.

Figure 8:
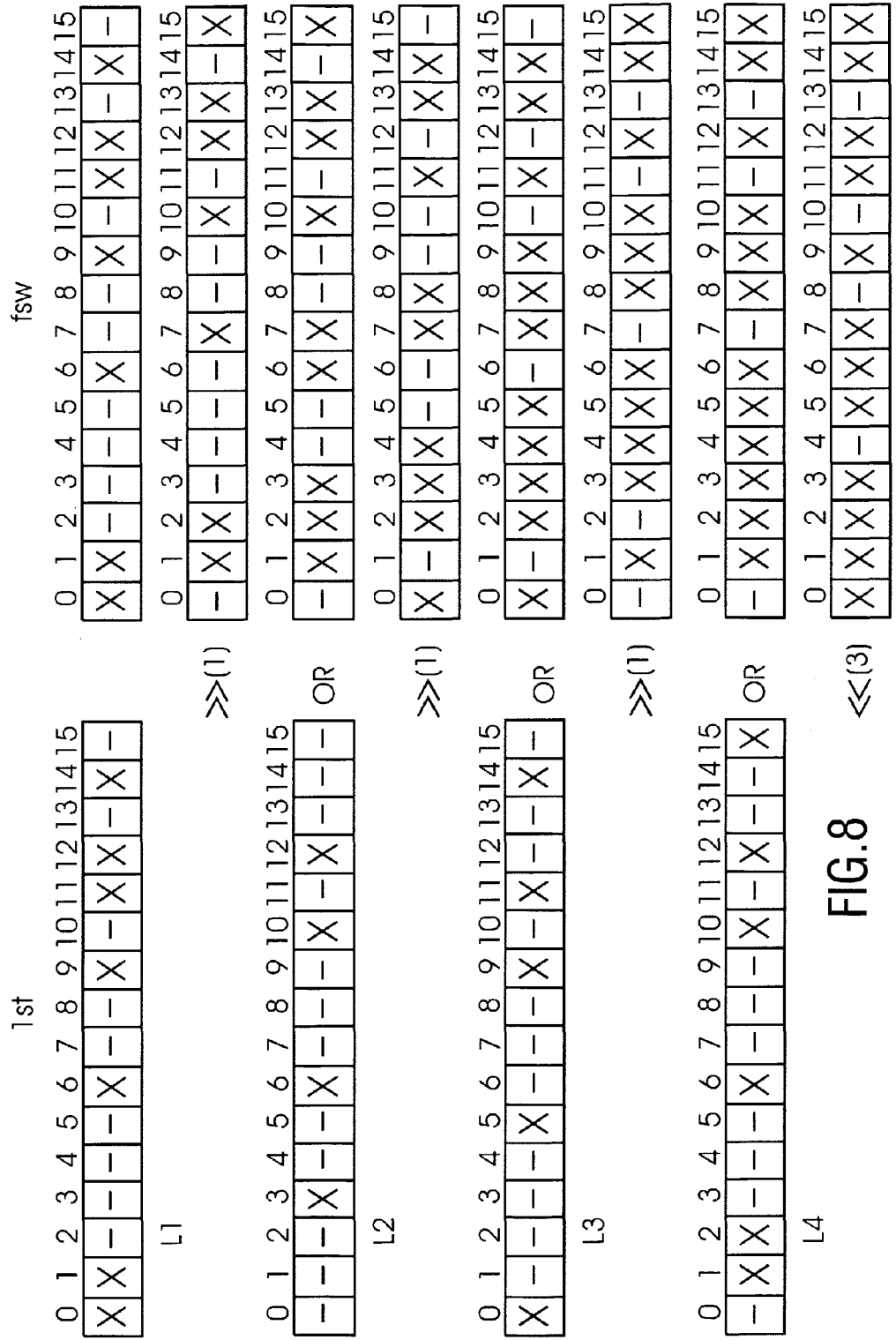
FIG. 8 shows an alternative method for finding free slots.

FIG. 8 shows another technique to speed-up the searching of free slots for the case where only the slot reservation is stored (using 1 bit) as described in FIG. 5. It is based on checking multiple slots in parallel. This can be performed both in hardware (a unit to check any fixed number of bits, i.e. the time slot allocation unit SA), and in software (CPU data words can store e.g., 16 or 32 slot reservation simultaneously). On the left hand side of FIG. 8 slot tables 1st for links L1 to L4 are shown as an example. On the right hand side free slot words fsw, which are used to determine the free slots along the path are shown. Free slots are found by traversing the slot tables and filtering the reserved ones, and shifting (>>(1)) the searched slots with one position at each link (corresponding to the required slot alignment). Firstly, the first link L1 of the path is chosen, which comprises reserved slots 0, 1, 6, 9, 11, 12, and 14. These slots are marked as reserved, e.g. by an 'X' in the free slot word. Thereafter, the free slot word fsw is shifted with one position to the right to reflect the slot alignment, and OR-ed, i.e. an OR operation is performed, to add the reserved slots of the second link (slots 3, 6, 10, and 12). These steps are repeated for the third and fourth link L3, L4, which results in a vector of free slots in all the links along the path. To align it to the first link L1, it is shifted to the left with three position. The result is that slots 4, 8, 10, and 13 of the first link L1 are free in all links L1-L4 along the given path. In particular, slot 4 is free for link L1, while slots 5, 6, and 7 are free for links L2, L3 and L4, respectively. Slot 8 is free in link L1, while slots 9, 10, and 11 are free for links L2, L3 and L4, respectively. In addition, slot 10 is free in link L1, while slots 11, 12, and 13 are free for links L2, L3 and L4, respectively. Slot 13 is free in link L1, while slots 14, 15, and 1 are free for links L2, L3 and L4, respectively.

Figure 9:
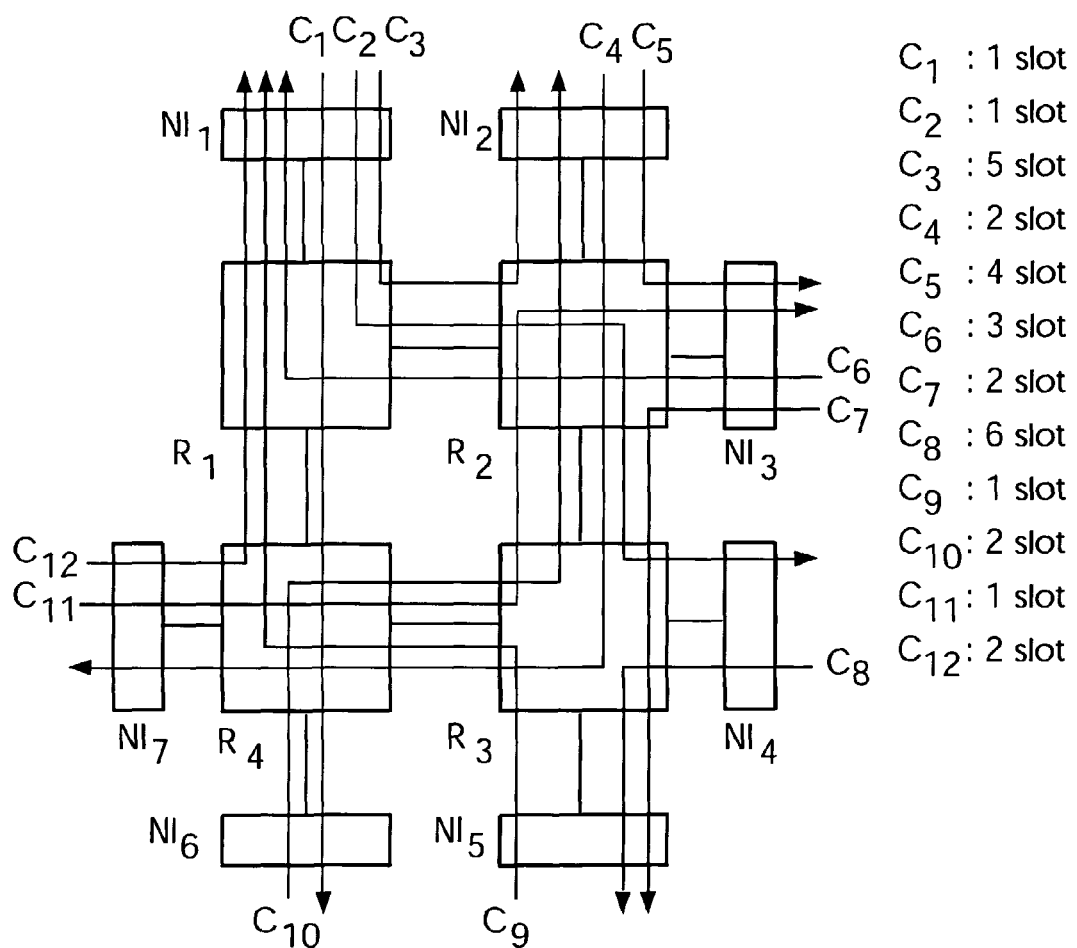
FIG. 9 shows a network on chip with several connections.

FIG. 9 shows an example of a network on chip consisting of 4 routers R1-R4 and 7 network interfaces NI (NI1-NI7). The IP block, with which the network interfaces are connected, are not shown. As an example 12 connections C1-C12 are selected. These connections are used to transport data between (the not shown) IP modules attached to network interfaces NIs, and, therefore, the connections are always set between two network interfaces NIs. For the sake of simplicity, we assume that all connections are unidirectional (consist of one channel), although in practice bi-directional connections (two channels) may also exists. For example, connection C1 starts at NI1, and goes through R1 and R4 to reach N16. Similarly, connection C2 goes through NI1, R1, R2, R3, and NI4. Connection C3 goes through NI1, R1, R2 and NI2. Connection C4 goes through NI2, R2, R3, R4, and NI7. Connection C5 goes through NI2, R2, and NI3. Connection C6 passes through NI3, R2, R1, and NI1. Connection C7 passes through NI3, R2, R3, and NI5. Connection C8 passes though NI4, R3, and NI5. Connection C9 passes though NI5, R3, R4, R1, and NI1. Connection C10 passes though NI6, R4, R3, R2, and NI2. Connection C11 passes though NI7, R4, R3, R2, and NI3. Connection C12 passes though NI7, R4, R1, and NI1. For each connection, a number of slots must be reserved. These numbers are listed on the right side of the FIG. 9, i.e. connection C1-C12 require 1, 1, 5, 2, 4, 3, 2, 6, 1, 2, 1, and 2 slots, respectively.

Figure 10:
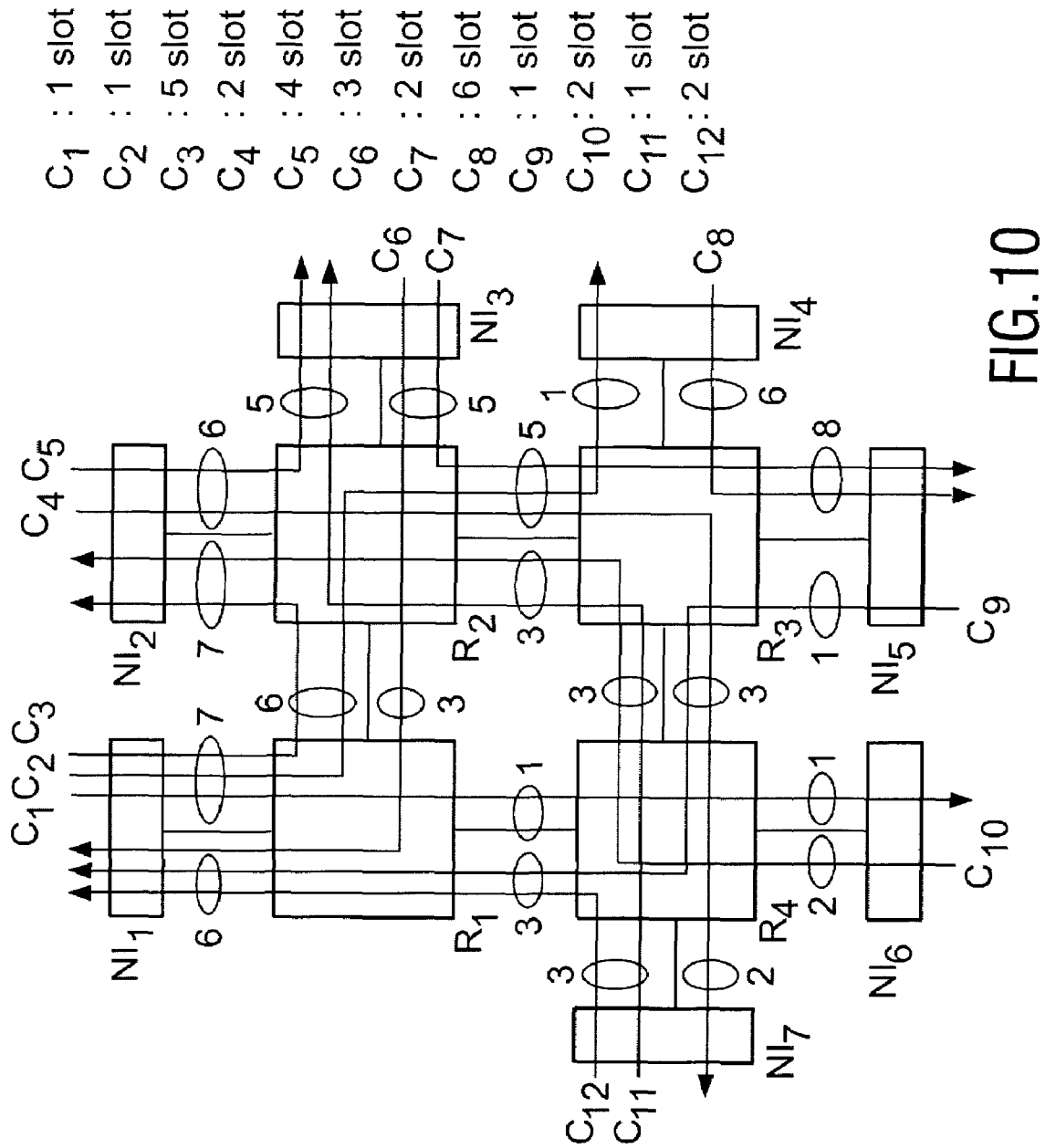
FIG. 10 shows a network on chip according to FIG. 9 with computed link weight.

FIG. 10 shows a network on chip according to FIG. 9. The algorithm starts by computing the link weights. This is done by summing for each link the number of slots requested for all the connections that use that link. This is performed separately for each direction. The links are encircled and a link weight result is written next to it. For example, for the link from R2 to R3 the slots requested by connections C2, C4 and C7 are added. This results in a link weight of 1 (C2)+2 (C4)+2 (C7)=5. The link between NI1 and R1 requires 7 slots, the link between R1 and NI1 6 slots etc.

Figure 11:
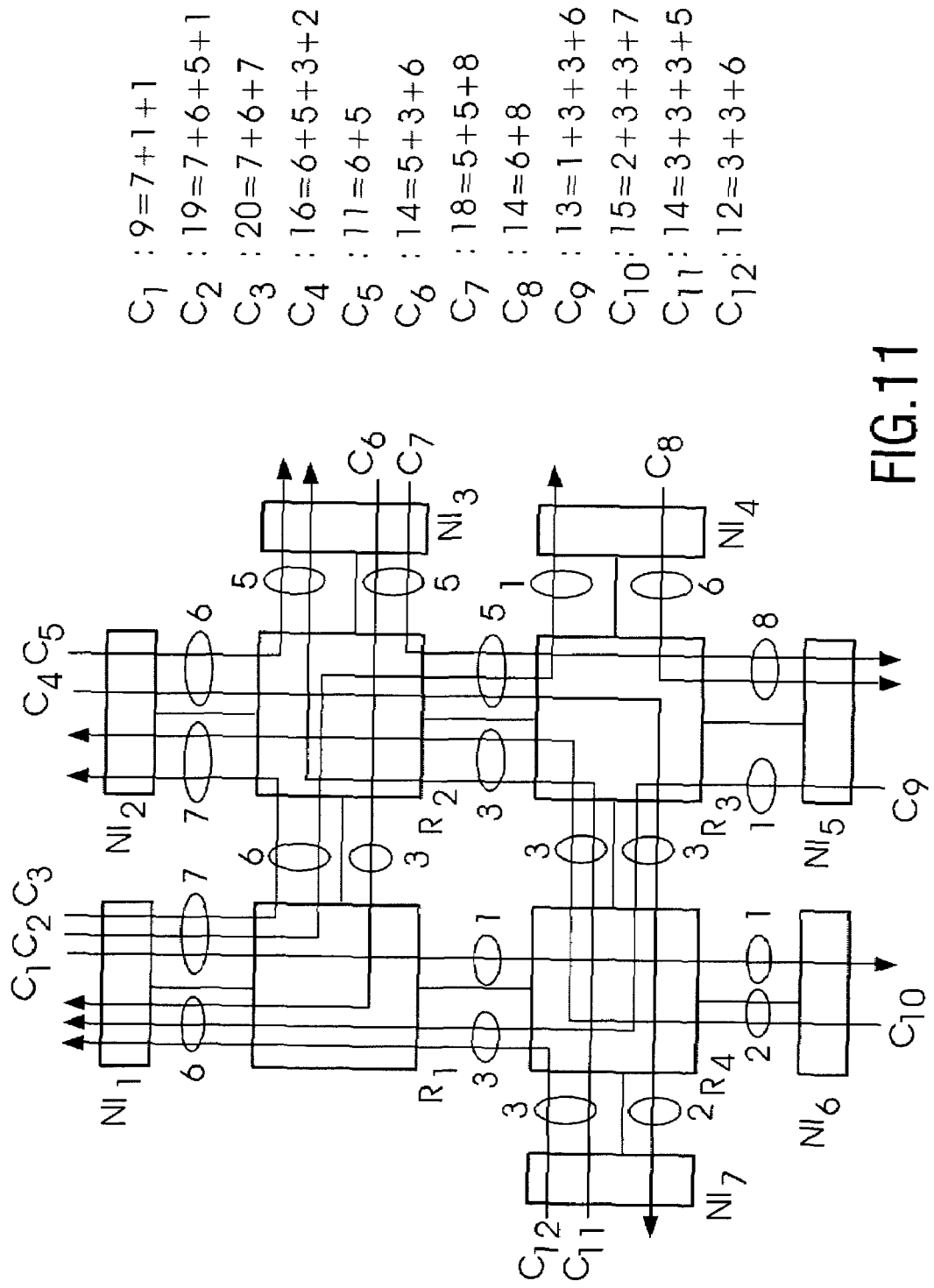
FIG. 11 shows a network on chip according to FIG. 10 with computed connection weights.

FIG. 11 shows a network on chip according to FIG. 10. The algorithm computes the connections weights. In the connection weight formula, a1=1, a2=0, and a3=0 (i.e., sum link weights). Alternatively, different values may be selected. The result of the connection weight are shown on the right hand side of FIG. 11. For example, the weight of connection C1 is the sum of the weights of links NI1 to R1, R1 to R4, and R4 to NI10, which is 7+1+1=9. The connections are then sorted decreasingly with regard to the computed weight factor, and scheduled in that order.

In FIGS. 12 to 23, the time slot allocation for all connections C1-C12 are shown. It is assumed that firstly the required free slots are allocated. As an example, the slot tables have a size of 9 slots. The depicted numbers in the slot tables correspond to the respective connections C1-C12 to which these slots have been allocated to.

FIGS. 12, 13, 14, 15 16, 17, 18, 19, 20, 21, 22, 23 show the allocation of the connections C3, C2, C7, C4, C11, C10, C6, C8, C9, C12, C5, and C1, respectively.

Figure 12:
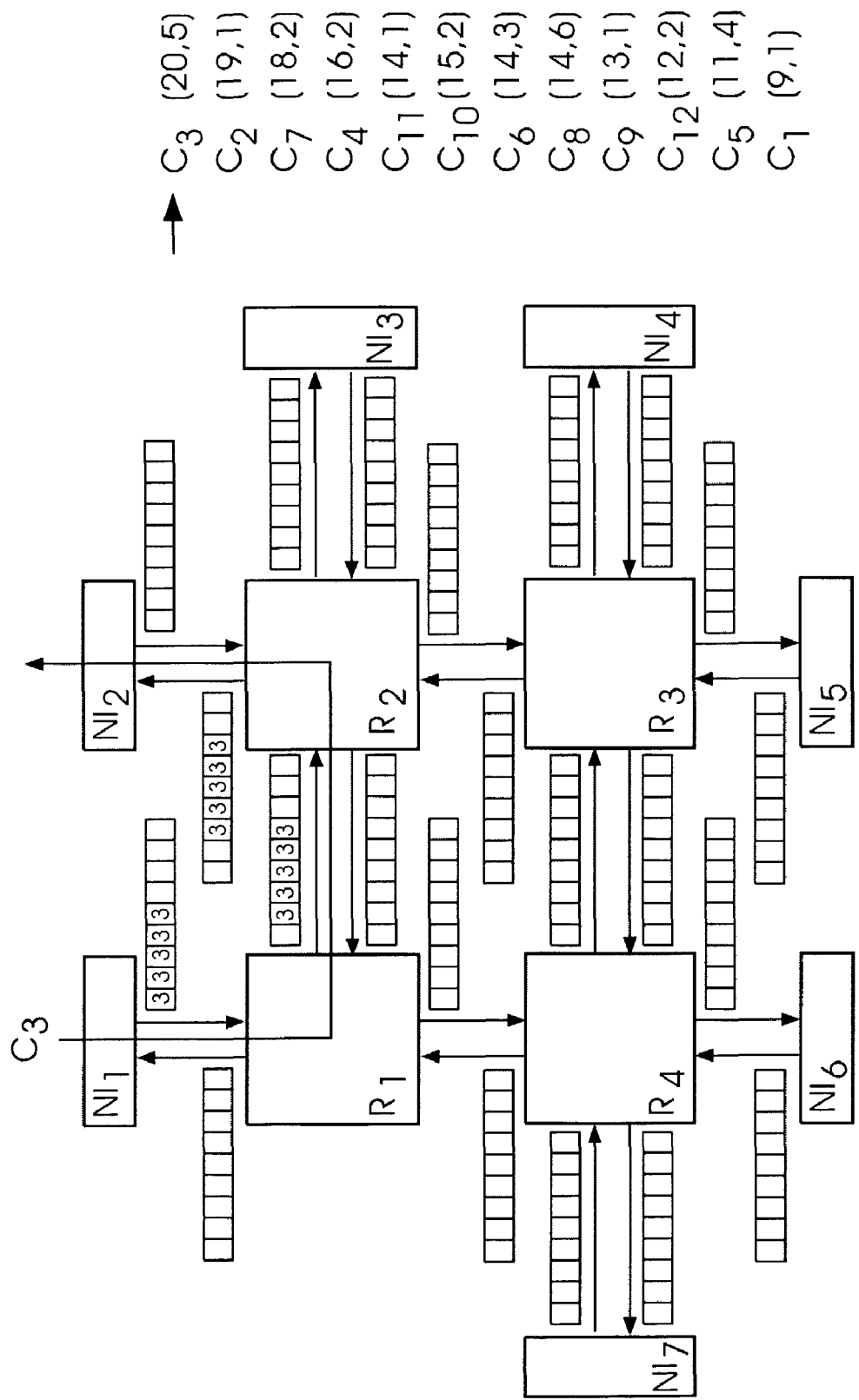
FIGS. 12-23 show a detailed slot allocation for the connections according to FIGS. 9-11, respectively.
Figure 13:
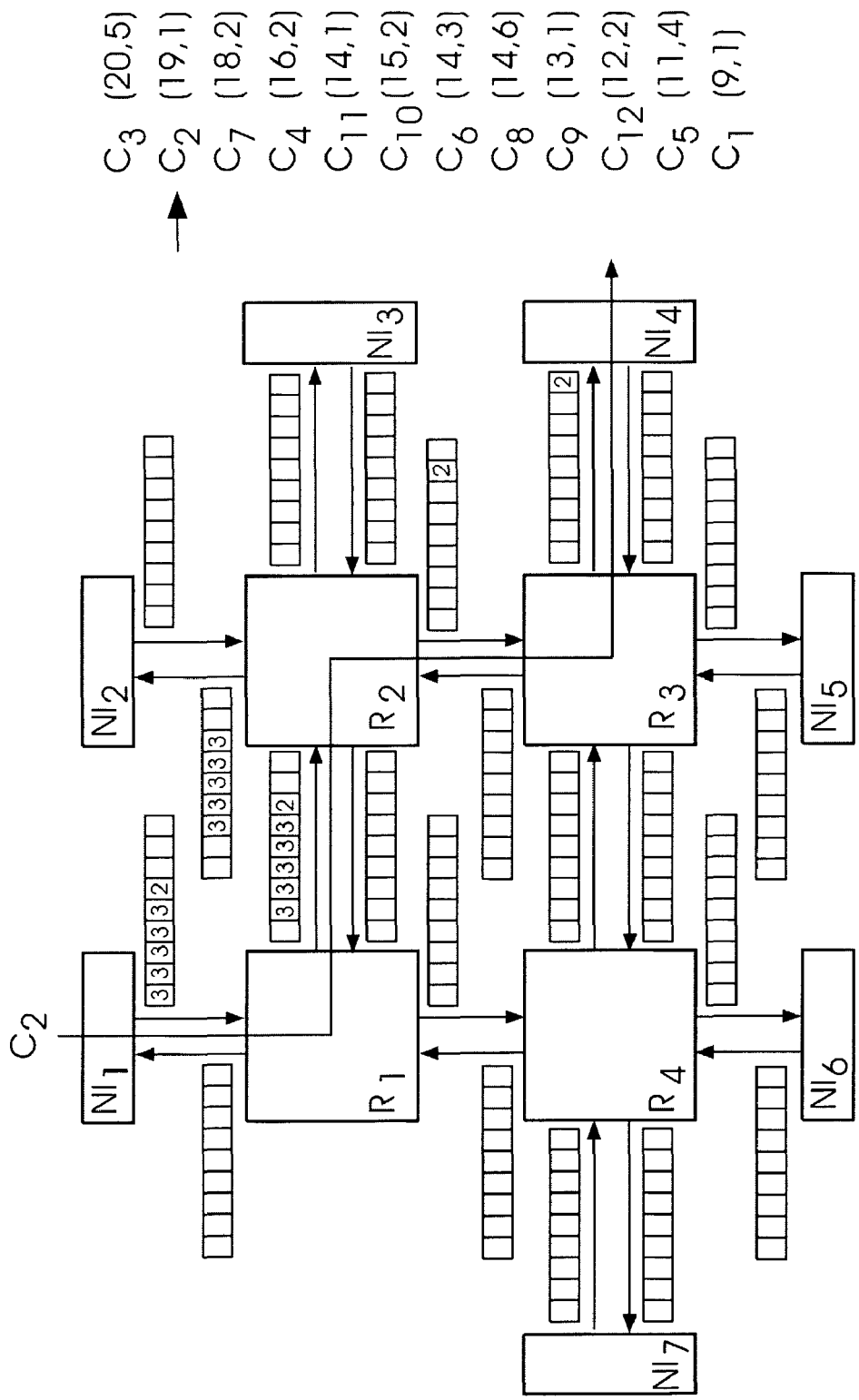
Figure 14:
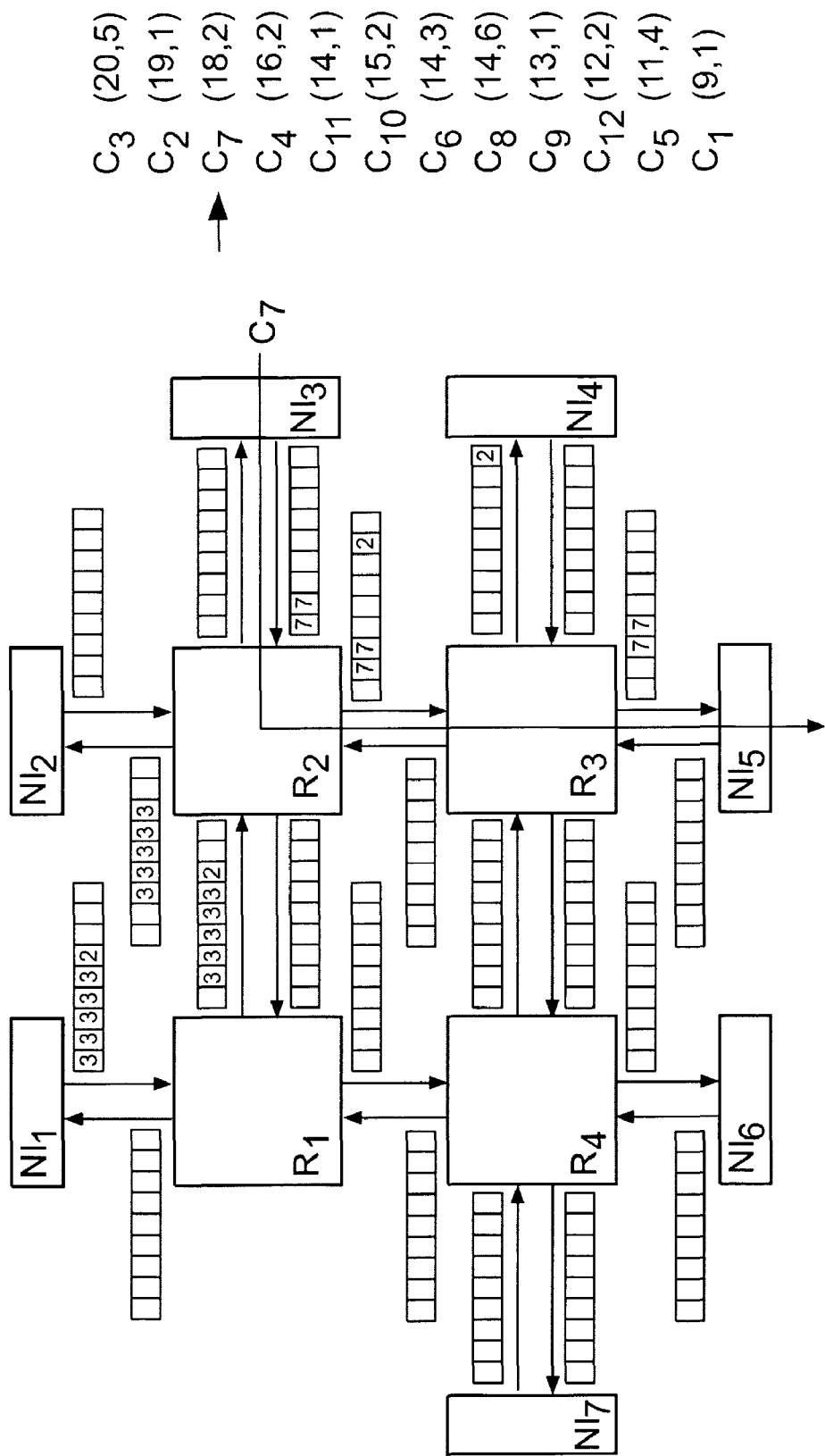
Figure 15:
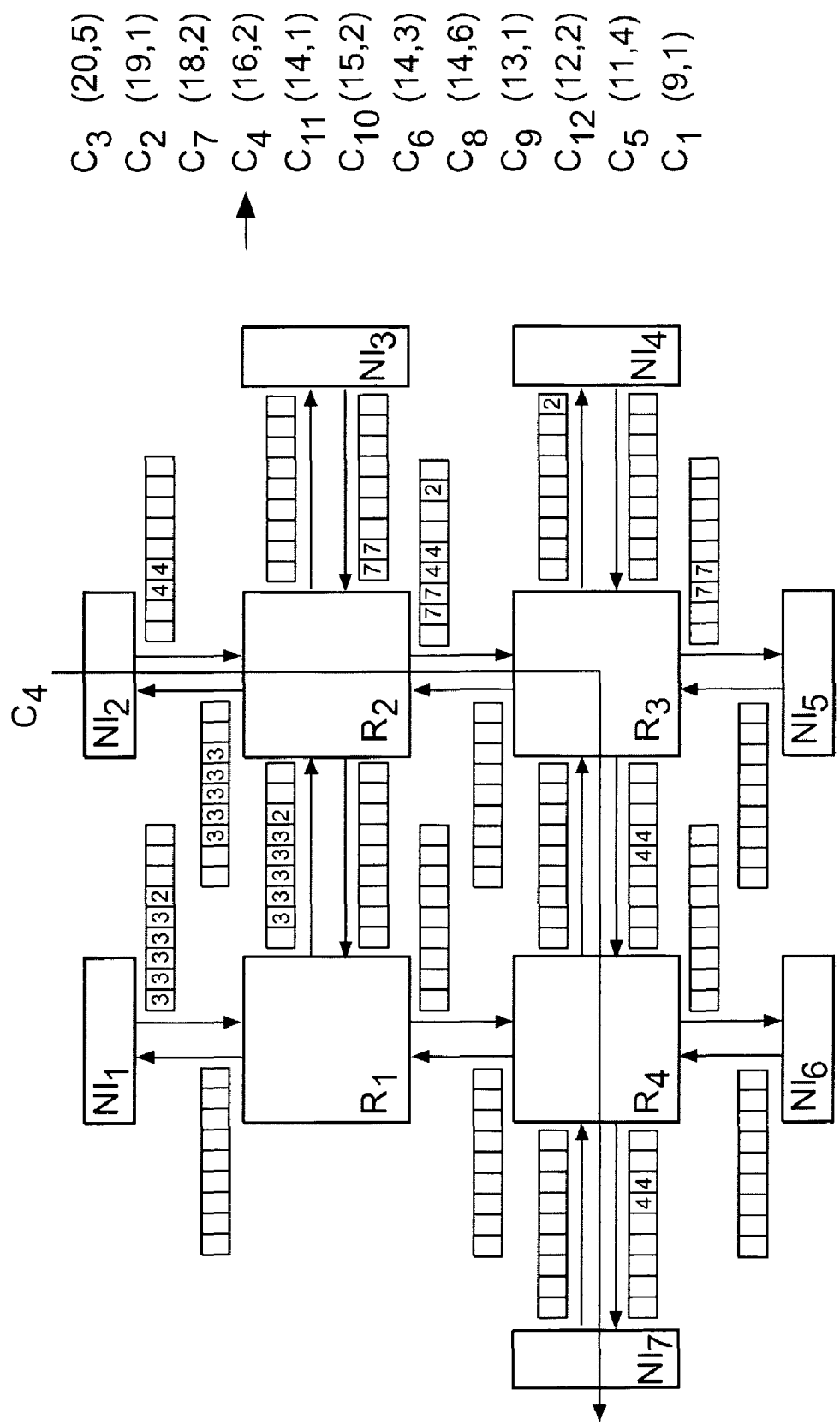
Figure 16:
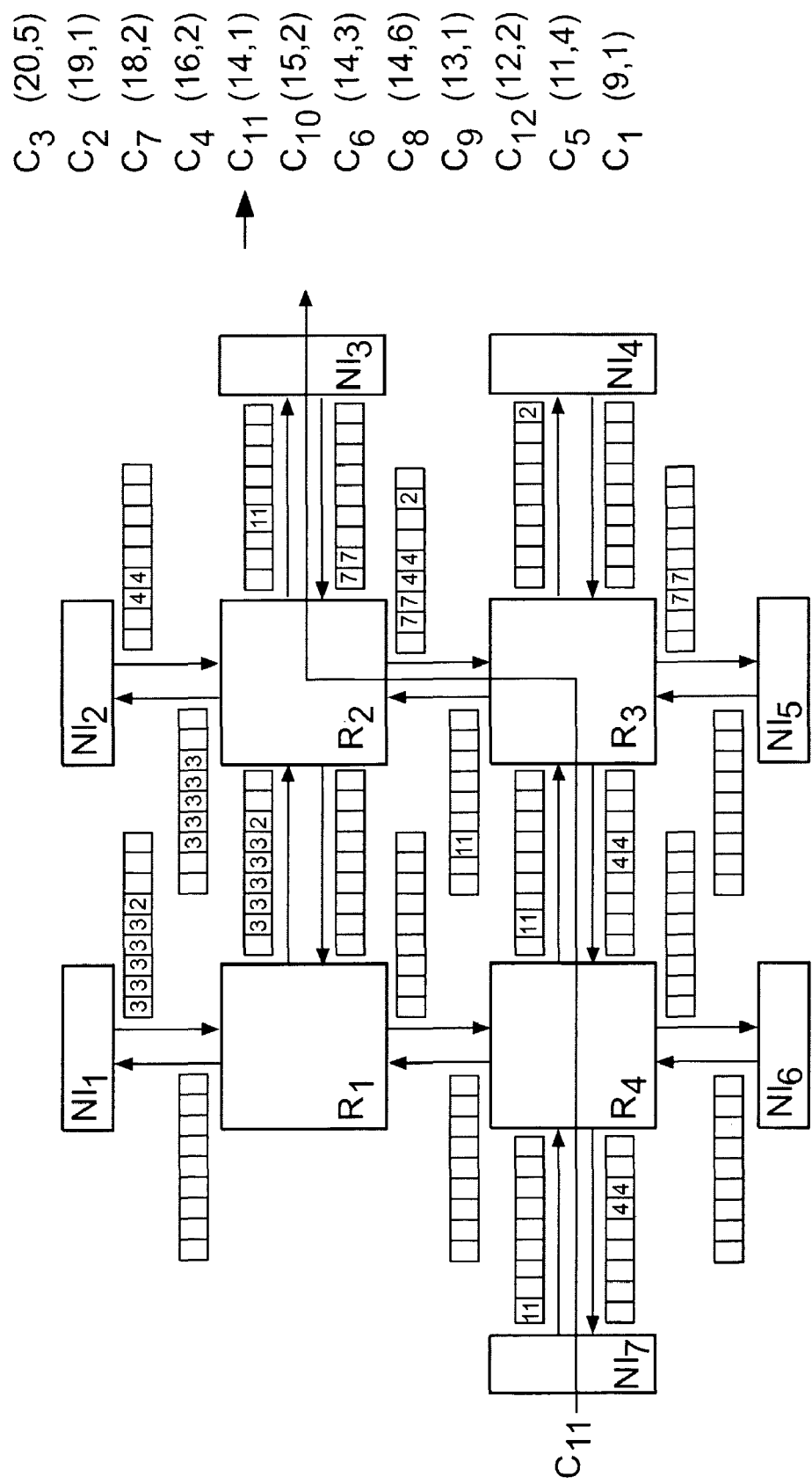

According to FIG. 12, for connection C3 requiring 5 slots, all slots are free, and, hence slots 1 to 5 of link NI1 to R1, slots 2-6 of the link R1 to R2, and slots 3-8 of the link R2 to NI2 are allocated to it. According to FIG. 13, for connection C2 requiring one slot, the first 5 slots are already reserved in the first link, and, hence, it reserves slot 6, 7, 8 and 9 in the respective slot tables along the path. According to FIG. 14, connection C7 requiring 2 slots has no conflicts in the first two slots, and, therefore, allocates them. According to FIG. 15, connection C4 requiring 2 slots can only reserve slots 3 and 4, as the first two are reserved for C7 in the second link (R2 to R3). According to FIG. 16 connection C11 again has no conflicts, and reserves the first slot in the slot table in the link of network interface NI7 and router R4 as well as the consecutive slots in the slot tables in the other links.

Figure 17:
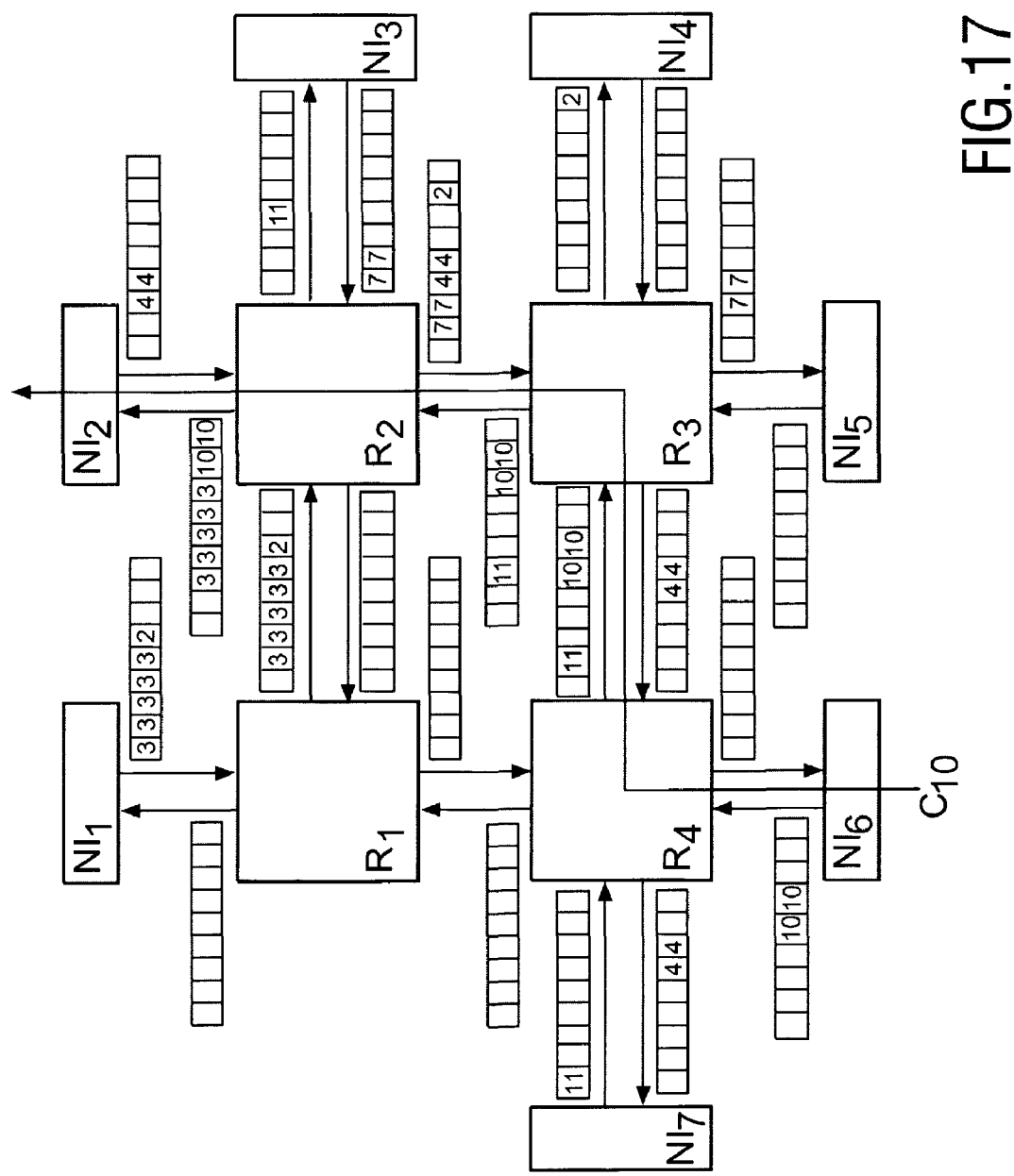
Figure 18:
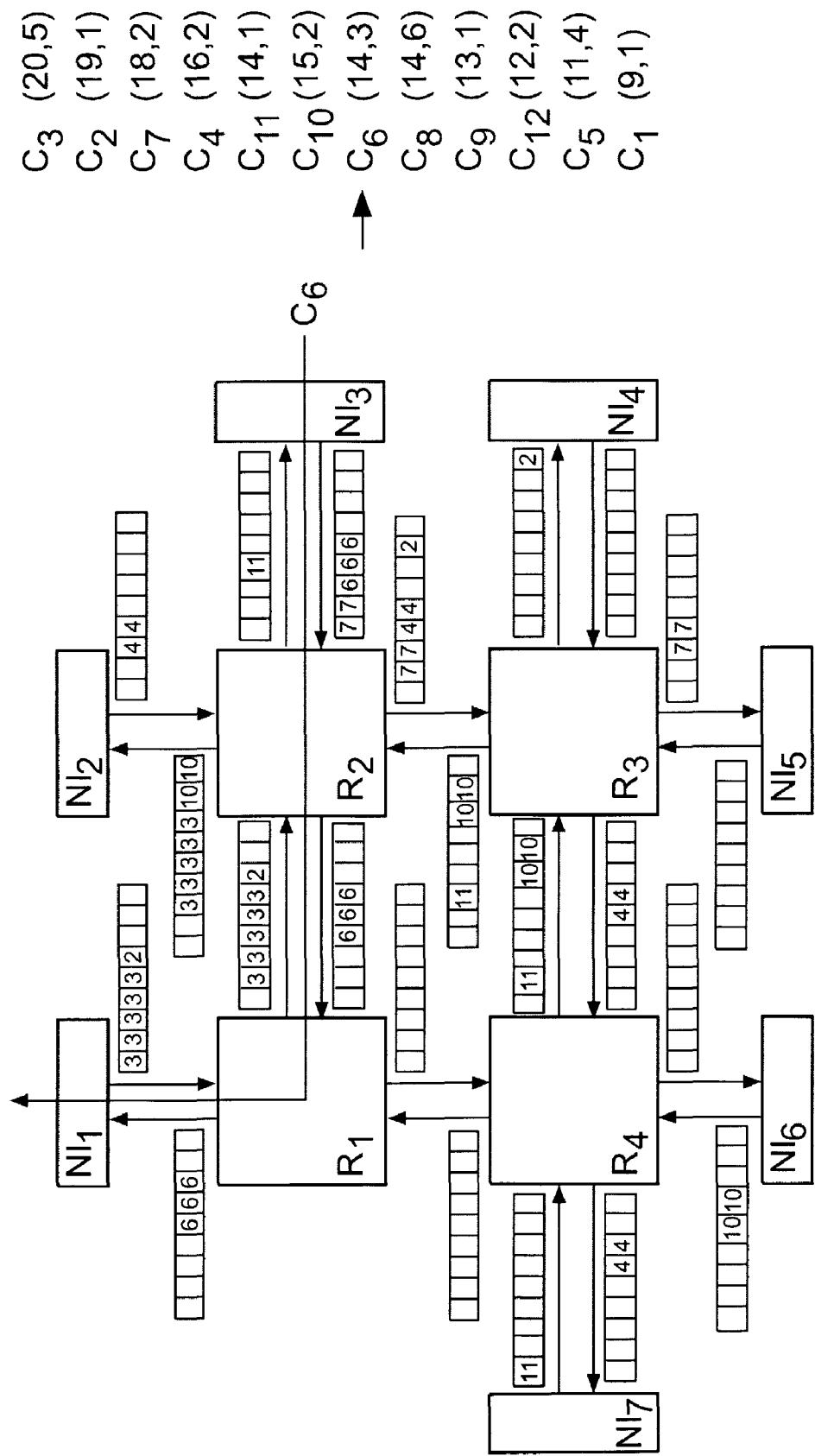
Figure 19:
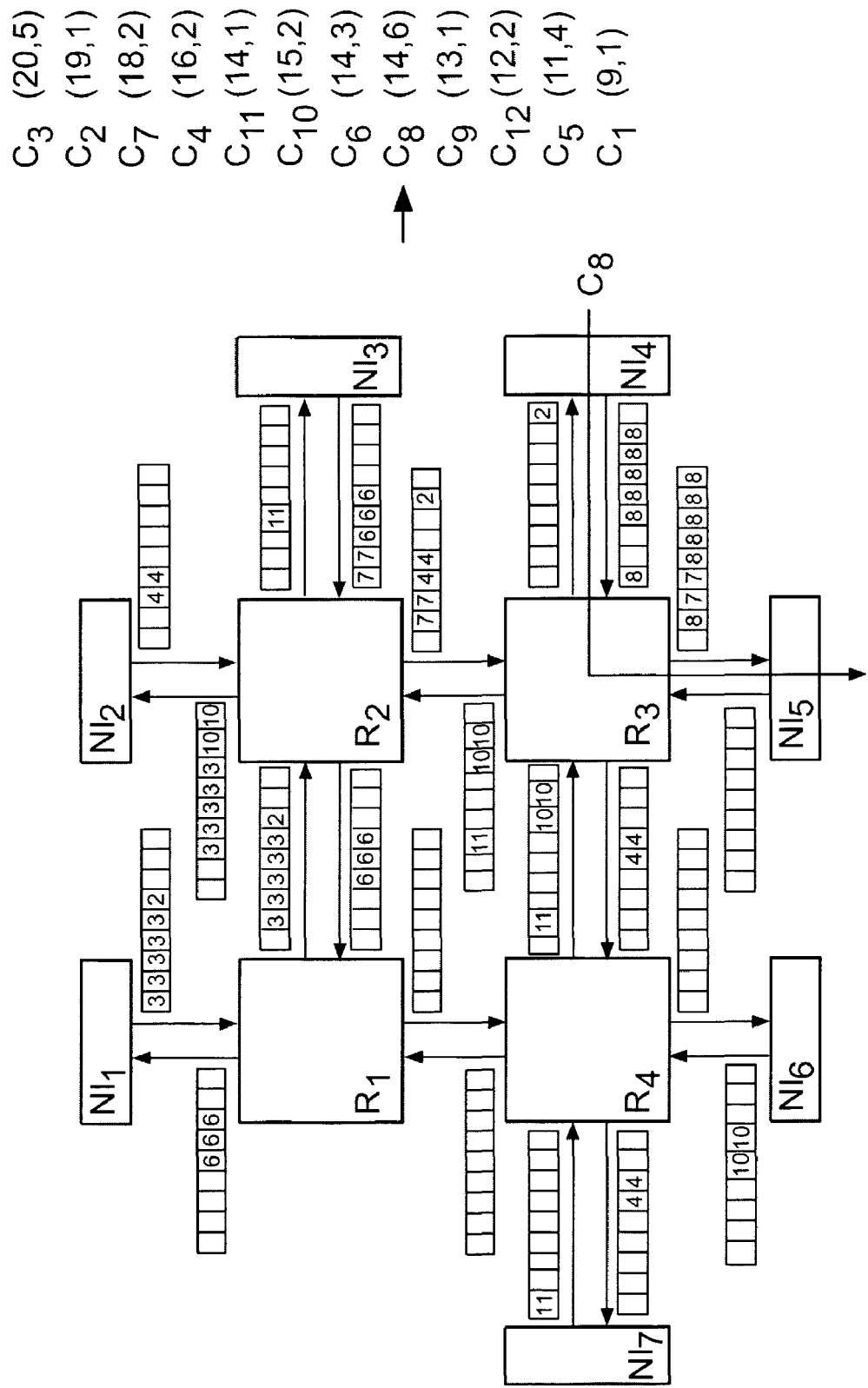

In the case of connection C10 requiring 2 slots according to FIG. 17, however, the first 4 slots conflict with the slots reserved for C3 in the link R2 to NI2, and, hence, the first free slots are 5 and 6. As shown in FIG. 18, connection C6 allocates three slots, namely slots 3-5, in the link of network interface NI3 and router R2; slots 4-6 in the slot table of the link of router R2 and router R1; and slots 5-7 in the slot table in the link of router R1 and network interface NI1. According to FIG. 19, connection C8 allocates 6 slots, namely slots 1, 4-8, in the link of network interface NI4 and router R3; and slots 2, 5-9 in the slot table of the link of router R3 and network interface NI5, as the slots 3-4 in the slot table of the link of router R3 and the network interface NI5 are already allocated or reserved to connection 7.

Figure 20:
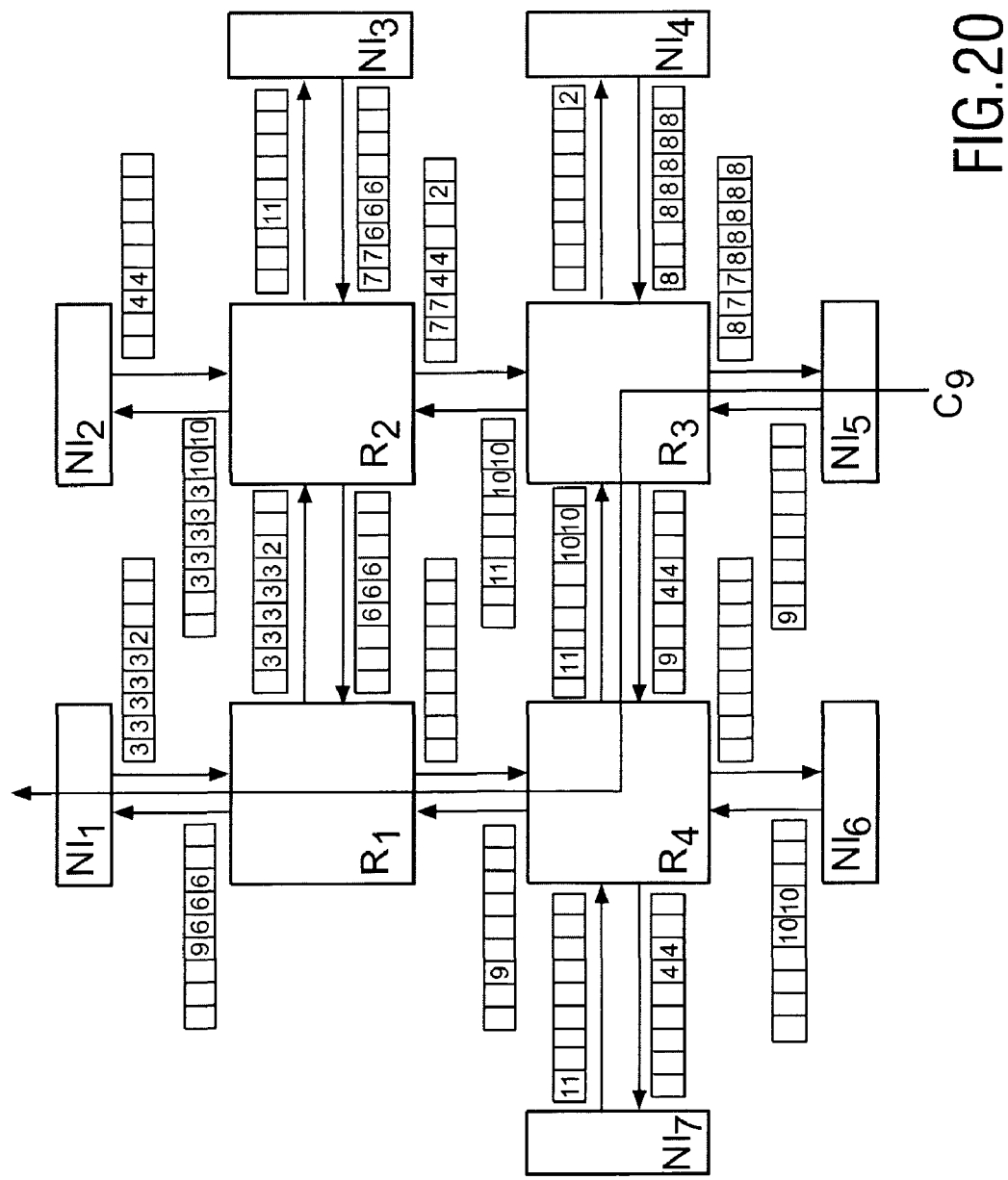
Figure 21:
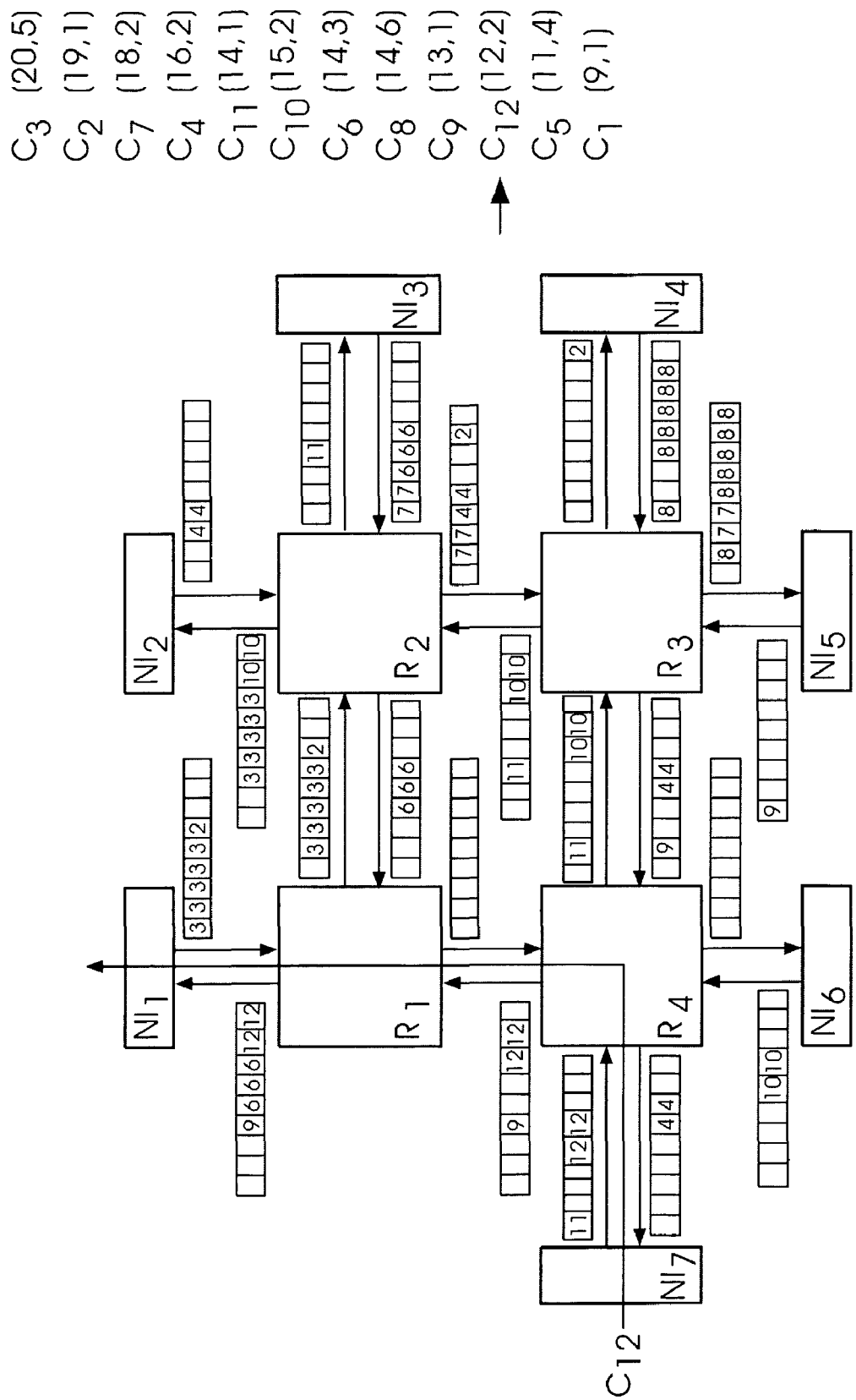

As shown in FIG. 20, connection C9 allocates one slot, namely slots 1, in the link of network interface NI5 and router R3; slot 2 in the slot table of the link of router R3 and router R4; slot 3 in the slot table of the link of router R4 and router R5; and slot 4 in the slot table in the link of router R1 and network interface NI1. According to FIG. 21, connection C12 allocates two slots, namely slots 6-7 in the link of network interface NI7 and router R4; slots 7-8 in the link of router R4 and router R1; and slots 8-9 in the slot table of the link of router R1 and network interface NI1, as the slot 4 and slots 5-7 in the slot table of the link of router R1 and the network interface NI1 are already allocated to connection C9 and C6, respectively.

Figure 22:
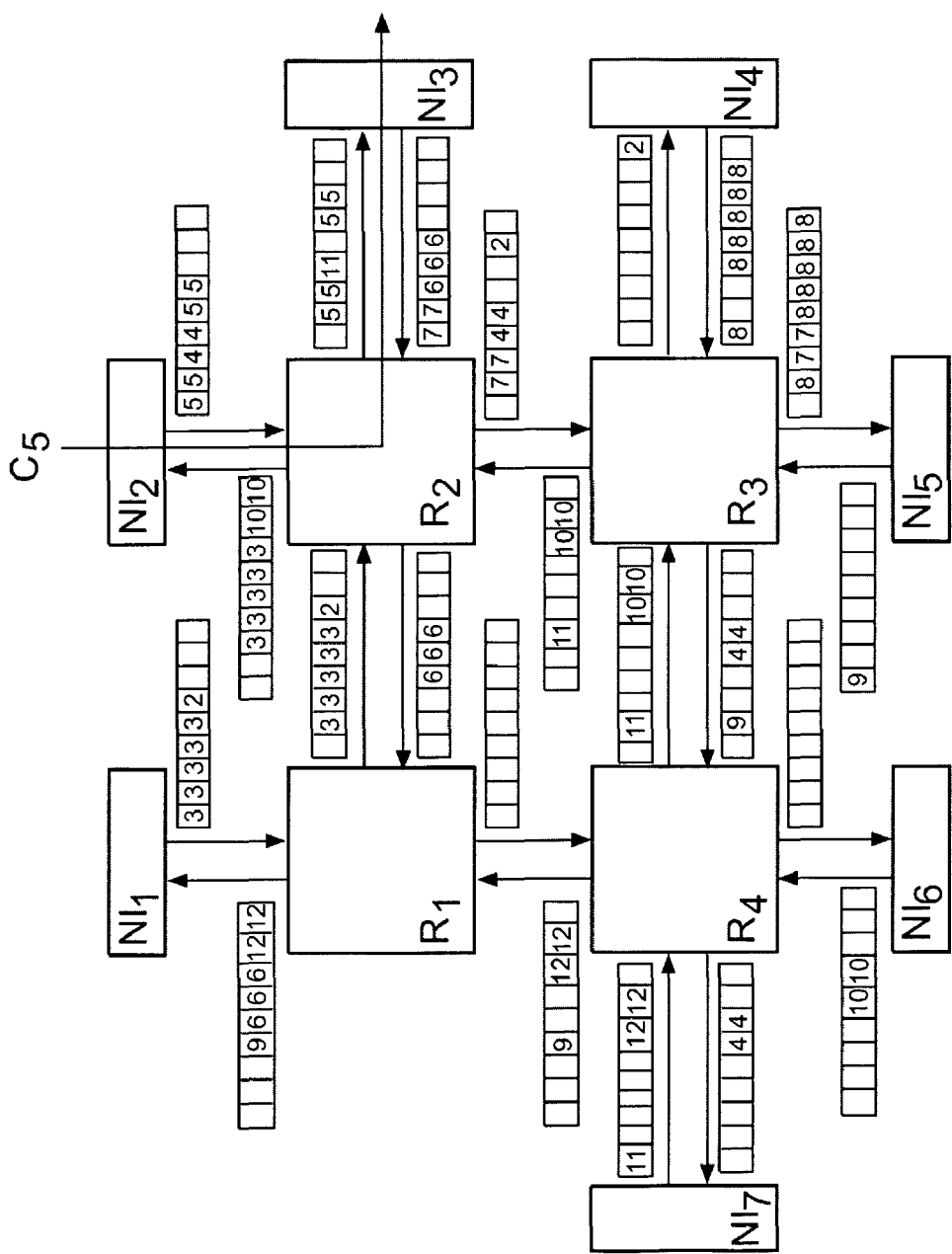

As depicted in FIG. 22, connection C5 allocates 4 slots, namely slots 1-2 and 5-6, in the slot table of the link of network interface NI2 and router R2; and slots 2-3 and 6-7 in the slot table of the link of router R2 and network interface NI3, as the slot 3-4 in the slot table of the link of network interface NI2 and router R2 are already allocated to connection C4.

Figure 23:
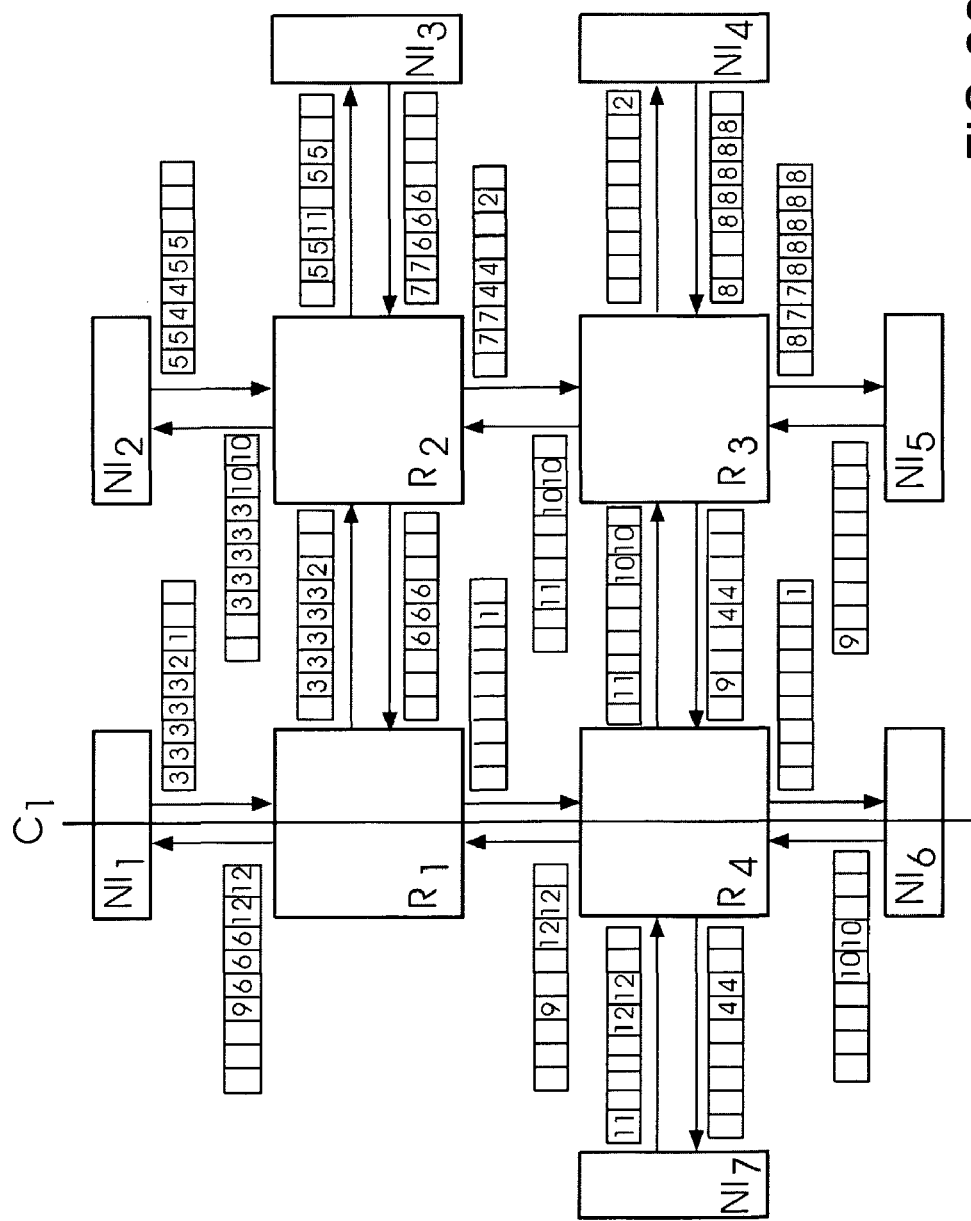

Finally, in FIG. 23 connection C1 allocates one slot, namely slot 7, in the slot table of the link of network interface NI1 and router R1; slot 8 in the slot table of the link of router R1 and router R4; and slot 9 in the slot table of the link of router R4 and network interface N16. Accordingly, the end result of the slot allocation is shown in FIG. 23.

Although in the above, the time slot allocation unit is described as being arranged in the network interfaces, the time slot allocation unit may also be arranged in the routers within the network.

The above described time slot allocation can be applied to any data processing device comprising several separated integrated circuits or multi-chip networks, not only to a network on a single chip.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Integrated circuit comprising a plurality of processing modules (M, S; IP) and a network (N) arranged for coupling said modules (M, S; IP), comprising
   a plurality of network interfaces (NI) each being coupled between one of said processing modules (M, S; IP) and said network (N);
   wherein said network (N) comprises a plurality of routers (R) coupled via network links (L) to adjacent routers (R);
   wherein said processing modules (M, S; IP) communicate between each other over connections using connection paths (C1-C12) through the network (N),
   wherein each of said connection paths (C1-C12) employ at least one network link (L) for a required number of time slots, at least one time slot allocating unit (SA) for computing a link weight factor for at least one network link (L) in said connection path (C1-C12) as a function of at least one connection requirement for said at least one network link (L), for computing a connection path weight factor for at least one connection path (C1-C12) as a function of the computed link weight factor of at least one network link (L) in said connection path (C1-C12), and for allocating time slots to said computed connection path according to the computed connection path weight factors.

2. Integrated circuit according to claim 1, wherein said at least one time slot allocating unit (SA) is further adapted to compute a connection path weight factor for at least one connection path (C1-C12) as a function of said at least one connection requirement of the said connection path.

3. Integrated circuit according to claim 1, wherein said connection requirements comprise bandwidth, latency, jitter, priority and/or slot allocation requirements of the connection path (C1-C12).

4. Integrated circuit according to claim 2, wherein said at least one time slot allocating unit (SA) is adapted to compute said function for computing link weights as a weighted sum of bandwidth and/or slot table requirements for said at least one network link (L).

5. Integrated circuit according to claim 3, wherein said at least one time slot allocating unit (SA) is adapted to compute said function for computing connection path weights as a weighted sum of the computed link weight factors of at least one network link (L) in said connection path (C1 -C12) and the bandwidth, latency, jitter, priority and/or slot allocation requirements of the said connection path (C1-C12).

6. Integrated circuit according to claim 1, wherein said at least one time slot allocating unit (SA) is adapted to allocate time slots to said at least one network link (L) in decreasing order of connection path weight factor.

7. Integrated circuit according to claim 1, wherein said at least one time slot allocating unit (SA) is adapted to compute said connection path weight factors based on said computed link weight factors, the length of said connection path (C1-C12), and the number of time slots required for said connection path (C1-C12).

8. Integrated circuit according to claim 7, wherein said at least one time slot allocating unit (SA) is adapted to compute said connection path weight factors based on said computed link weight factors, the length of said connection path (C1-C12), and the number of time slots required for said connection path weighted by a first, second and third weight factor (a1, a2, a3), respectively.

9. Integrated circuit according to claim 7, wherein at least one time slot allocating unit (SA) is arranged in at least one of said plurality of network interface (NI) and comprises a first time slot table (ST) with entries specifying connections to which time slots are allocated to, and said routers (R) comprise second time slot tables (ST) with entries representing reservations of time slots without specifying connections.

10. Integrated circuit according to claim 9, wherein said routers (R) move data arranged in packets with packet headers according to said packet headers.

11. Integrated circuit according to claim 1, wherein at least one time slot allocating unit (SA) is arranged in at least one of said plurality of network interface (NI) and comprises a first time slot table (ST) with entries specifying connections to which time slots are allocated to, and said routers (R) comprise second time slot tables (ST) with entries comprising information for routing data in said network (N).

12. Integrated circuit according to claim 9, wherein said time slot allocating unit (SA) is adapted to find the first free time slots in said first and second slot tables (ST1, ST2) along said connection paths (C1-C12) according to the required time slots of said connections (C1-C12).

13. Integrated circuit according to claim 9, said time slot allocating unit (SA) is adapted to find the required free time slots in said first and second time slot tables (ST1, ST2) for said connections (C1-C12) by finding at least a first free time slot in one of said first and second slot tables (ST1, ST2), by computing positions which are equally distanced in the slot table, and by searching locally around the computed positions to find the nearest free time slot.

14. Integrated circuit according to claim 13, wherein the search for free time slots is started from the most loaded network link (L).

15. Integrated circuit according to claim 9, wherein said time slot allocating unit (SA) is adapted to find the required free time slots in said first and second time slot tables (ST1, ST2) for said connections (C1-C12) by traversing said slot tables (ST1, ST2), by filtering the reserved time slots, and by shifting the searched time slots with one position for each network link (L) in said connection (C1-C12).

16. Method for time slot allocation in an integrated circuit comprising a plurality of processing modules (M, S; IP) and a network (N) arranged for coupling said modules (M, S; IP), and a plurality of network interfaces (NI) each being coupled between one of said processing modules (M, S; IP) and said network (N) comprising a plurality of routers (R) coupled via network links (L) to adjacent routers (R); comprising the steps of:

- communicating between processing modules (M, S; IP) over connections using connection paths (C1-C12) through the network (N), wherein each of said connection paths (C1-C12) employ at least one network link (L) for a required number of time slots,
- computing a link weight factor for at least one network link (L) in said connection path (C1-C12) as a function of at least one connection requirement for said network links (L),
- computing a connection path weight factor for at least one connection path (C1-C12) as a function of the computed link weight factor of at least one network link (L) in a connection path (C1-C12), and
- allocating time slots to said computed connection path (C1-C12) according to the computed connection path weight factors.

17. Data processing system comprising:

a plurality of processing modules (M, S; IP) and a network (N) arranged for coupling said modules (M, S; IP), comprising:
- a plurality of network interfaces (NI) each being coupled between one of said processing modules (M, S; IP) and said network (N);

wherein said network (N) comprises a plurality of routers (R) coupled via network links (L) to adjacent routers (R);

wherein said processing modules (M, S; IP) communicate between each other over connections using connection paths (C1-C12) through the network (N), wherein each of said connection paths (C1-C12) employ at least one network link (L) for a required number of time slots, at least one time slot allocating unit (SA) for computing a link weight factor for at least one network link (L) in said connection path (C1-C12) as a function of at least one connection requirement for said at least one network link (L), for computing a connection path weight factor for at least one connection path (C1-C12) as a function of the computed link weight factor of at least one network link (L) in said connection path (C1-C12), and for allocating time slots to said computed connection path (C1-C12) according to the computed connection path weight factors.

* * * * *